US012682378B2

(12) United States Patent
Dohrn

(10) Patent No.: US 12,682,378 B2
(45) Date of Patent: Jul. 14, 2026

(54) APPARATUS FOR GENERATING A TRANSPORT REQUEST USING A GRAPHICAL USER INTERFACE

(71) Applicant: Hammel Companies Inc., Pittsburgh, PA (US)

(72) Inventor: Joseph Charles Dohrn, Woodland Park, CO (US)

(73) Assignee: Hammel Companies Inc., Pittsburgh, PA (US)

( * ) Notice: Subject to any disclaimer, the term of this patent is extended or adjusted under 35 U.S.C. 154(b) by 0 days.

(21) Appl. No.: 17/749,669

(22) Filed: May 20, 2022

(65) Prior Publication Data

US 2023/0401614 A1     Dec. 14, 2023

(51) Int. Cl.
*G06Q 30/06* (2023.01)
*G06F 3/0481* (2022.01)
*G06F 3/0484* (2022.01)
*G06Q 10/0834* (2023.01)
*G06Q 30/0601* (2023.01)

(52) U.S. Cl.
CPC ........... *G06Q 30/06* (2013.01); *G06F 3/0481* (2013.01); *G06F 3/0484* (2013.01); *G06Q 10/0834* (2013.01); *G06Q 30/0635* (2013.01); *G06Q 30/0631* (2013.01)

(58) Field of Classification Search
CPC .... G06Q 10/08; G06Q 10/0834; G06Q 30/06; G06Q 30/0635; G06Q 30/0631; G06F 3/00
See application file for complete search history.

(56) References Cited

U.S. PATENT DOCUMENTS

| | | | |
|---|---|---|---|
| 7,765,120 B2 | 7/2010 | Yadappanavar et al. | |
| 8,572,001 B2 | 10/2013 | Hollis | |
| 2013/0179299 A1* | 7/2013 | Crutcher | G06Q 30/06 |
| | | | 705/26.8 |

(Continued)

FOREIGN PATENT DOCUMENTS

WO     2014178055     11/2014

OTHER PUBLICATIONS

Dharani, M., et al. "Interactive transport enquiry with ai chatbot." 2020 4th international conference on intelligent computing and control systems (ICICCS). IEEE, 2020. (Year: 2020).*

(Continued)

*Primary Examiner* — Scott M Tungate
(74) *Attorney, Agent, or Firm* — Caldwell LLC

(57) ABSTRACT

In an aspect an apparatus for generating a transport request is presented. An apparatus includes at least a processor and a memory communicatively connected to the at least a processor. A memory contains instructions configuring at least a processor to generate a graphical user interface. A graphical user interface includes a multi-part display window. A graphical user interface includes at least a user input field. A graphical user interface includes a transitional button. A graphical user interface includes a verification module. A graphical user interface includes an error prevention module. At least a processor is configured to generate a transport request as a function of user input of a GUI. At least a processor is configured to provide a carrier recommendation.

16 Claims, 13 Drawing Sheets

1200

Displaying Transport Data — 1205

Receiving User Input — 1210

Verifying User input — 1215

Providing Error Feedback — 1220

1225

Presenting at Least a Second Window — 1225

Generating a Transport Request — 1230

Displaying a Carrier Recommendation — 1235

(56)         References Cited

U.S. PATENT DOCUMENTS

| | | | |
|---|---|---|---|
| 2014/0149321 A1 | 5/2014 | Laumanns et al. | |
| 2014/0180957 A1* | 6/2014 | Arunapuram | G06Q 10/08355 |
| | | | 705/338 |
| 2016/0300186 A1 | 10/2016 | Scharaswak et al. | |
| 2019/0213500 A1 | 7/2019 | Chowdhary et al. | |
| 2020/0357089 A1 | 11/2020 | Mohr et al. | |
| 2021/0073734 A1 | 3/2021 | Aman et al. | |
| 2021/0133655 A1 | 5/2021 | Suemitsu et al. | |
| 2021/0304271 A1* | 9/2021 | Norwood | G06Q 30/0641 |
| 2021/0374669 A1* | 12/2021 | Neumann | G01C 21/3407 |
| 2022/0122034 A1* | 4/2022 | Kawano | G06Q 10/0834 |
| 2022/0147908 A1* | 5/2022 | Yag | G06N 20/00 |

OTHER PUBLICATIONS

Allen, J., Bektas, T., Cherrett, T., Friday, A., Mcleod, F., Piecyk, M.,
Piotrowska, M. and Zaltz Austwick, M., Enabling the freight traffic
controller for collaborative multi-drop urban logistics: practical and
theoretical challenges, Dec. 31, 2017.

* cited by examiner

APPARATUS FOR GENERATING A TRANSPORT REQUEST USING A GRAPHICAL USER INTERFACE

FIELD OF THE INVENTION

The present invention generally relates to the field of graphical user interfaces. In particular, the present invention is directed to a graphical user interface for generating a transport request.

BACKGROUND

Modern transportation management systems in supply chains deal with complex communications. However, modern graphical user interfaces dealing with supply chains lack transparency and efficiency and therefore can be improved.

SUMMARY OF THE DISCLOSURE

In an aspect an apparatus for generating a transport request is presented. An apparatus includes at least a processor and a memory communicatively connected to the at least a processor. A memory contains instructions configuring at least a processor to generate a graphical user interface. A graphical user interface includes a multi-part display window. A graphical user interface includes at least a user input field. A graphical user interface includes a transitional button. A graphical user interface includes a verification module. A graphical user interface includes an error prevention module. At least a processor is configured to generate a transport request as a function of user input of a GUI. At least a processor is configured to provide a carrier recommendation.

In another aspect a method of generating a transport request using a computing device is presented. A method includes displaying transport data through a multi-part display window of a graphical user interface. A method includes receiving user input from at least a user input field of a multi-part display window of a GUI. A method includes verifying user input as a function of a verification module of a GUI. A method includes providing error feedback through a GUI as a function of an error prevention module of the GUI. A method includes presenting at least a second window of a multi-part display window of the GUI as a function of a transitional button of the GUI. A method includes generating a transport request for a user as a function of user input of a GUI. A method includes displaying a carrier recommendation through a GUI.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to apparatuses and methods for generating a transport request. In an embodiment, an apparatus may generate a graphical user interface having a multi-part display window.

Aspects of the present disclosure can be used to generate transport requests. Aspects of the present disclosure can also be used to monitor transport requests, display transport recommendations, and initiate transport requests. Exemplary embodiments illustrating aspects of the present disclosure are described below in the context of several specific examples.

Figure 1:
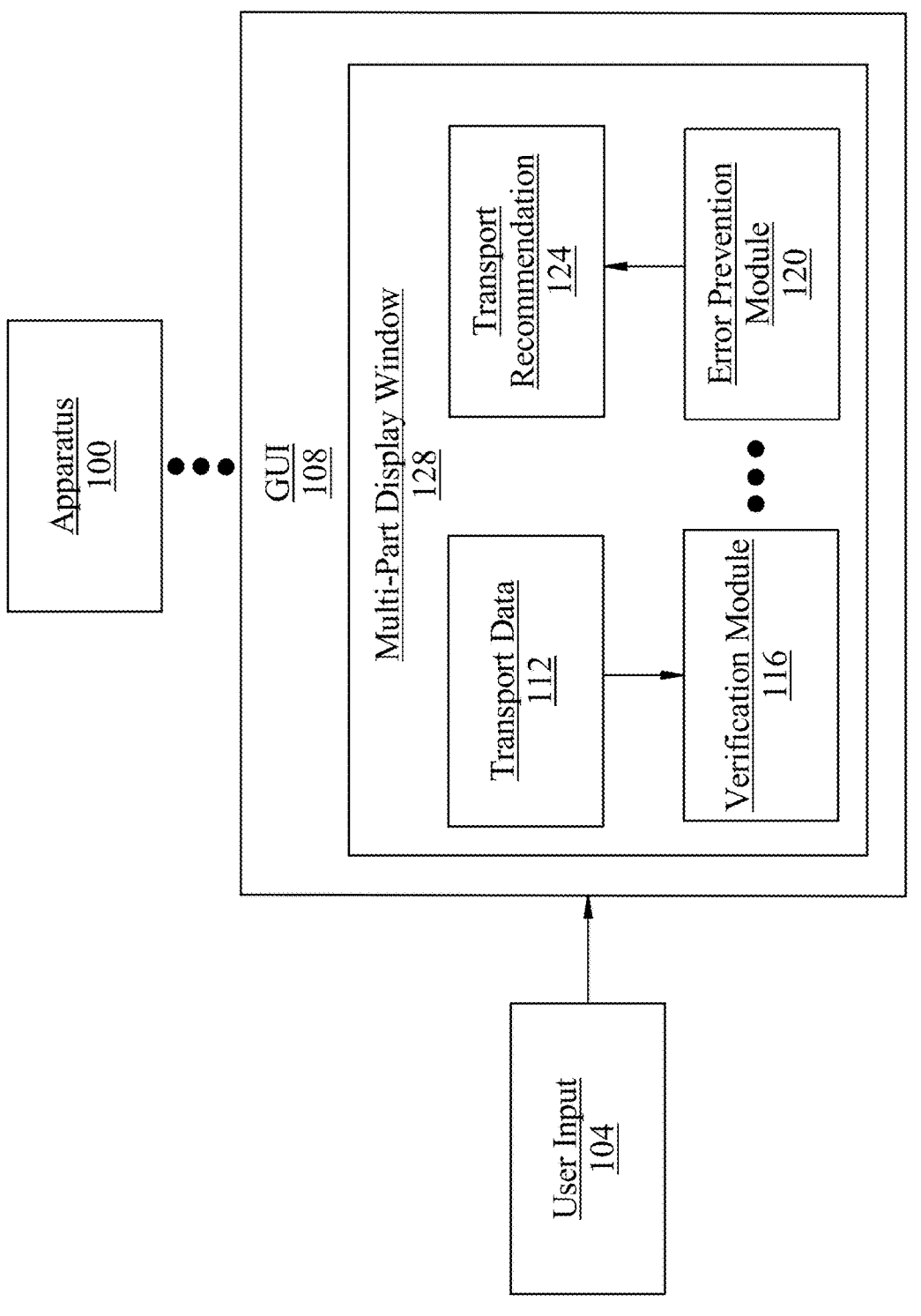
FIG. 1 is an exemplary embodiment of a block diagram of an apparatus for generating a transport request.

Referring now to FIG. 1, an exemplary embodiment of apparatus 100 for generating a transport request is illustrated. Apparatus 100 may include at least a processor and a memory communicatively connected to the at least a processor. A memory may contain instructions configuring at least a processor to perform various tasks. In some embodiments, apparatus 100 may include a computing device such as any computing device as described in this disclosure, including without limitation a microcontroller, microprocessor, digital signal processor (DSP) and/or system on a chip (SoC) as described in this disclosure. Apparatus 100 may include, be included in, and/or communicate with a mobile device such as a mobile telephone or smartphone. Apparatus 100 may include a single computing device operating independently, or may include two or more computing device operating in concert, in parallel, sequentially or the like; two or more computing devices may be included together in a single computing device or in two or more computing devices. Apparatus 100 may interface or communicate with one or more additional devices as described below in further detail via a network interface device. Network interface device may be utilized for connecting apparatus 100 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Apparatus 100 may include but is not limited to, for example, a computing device or cluster of computing devices in a first location and a second computing device or cluster of computing devices in a second location. Apparatus 100 may include one or more computing devices dedicated to data storage, security, distribution of traffic for load balancing, and the like. Apparatus 100 may distribute one or more computing tasks as described below across a plurality of computing devices of computing device, which may operate in parallel, in series, redundantly, or in any other manner used for distribution of tasks or memory between computing devices. Apparatus 100 may be implemented using a "shared nothing" architecture in which data is cached at the worker, in an embodiment, this may enable scalability of system 100 and/or computing device.

With continued reference to FIG. 1, apparatus 100 may be designed and/or configured to perform any method, method step, or sequence of method steps in any embodiment described in this disclosure, in any order and with any degree of repetition. For instance, apparatus 100 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Apparatus 100 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 1, apparatus 100 may be configured to generate graphical user interface (GUI) 108. A "graphical user interface" as used in this disclosure is an interface including set of one or more pictorial and/or graphical icons corresponding to one or more computer actions. GUI 108 may be configured to receive user input 104. GUI 108 may include one or more event handlers. An "event handler" as used in this disclosure is a callback routine that operates asynchronously once an event takes place. Event handlers may include, without limitation, one or more programs to perform one or more actions based on user input, such as generating pop-up windows, submitting forms, changing background colors of a webpage, and the like. Event handlers may be programmed for specific user input, such as, but not limited to, mouse clicks, mouse hovering, touch-screen input, keystrokes, and the like. For instance, and without limitation, an event handler may be programmed to generate a pop-up window if a user double clicks on a specific icon. User input 104 may include, a manipulation of computer icons, such as, but not limited to, clicking, selecting, dragging and dropping, scrolling, and the like. In some embodiments, user input 104 may include an entry of characters and/or symbols in a user input field. A "user input field" as used in this disclosure is a portion of graphical user interface configured to receive data from an individual. A user input field may include, but is not limited to, text boxes, search fields, filtering fields, and the like. In some embodiments, user input 104 may include touch input. Touch input may include, but is not limited to, single taps, double taps, triple taps, long presses, swiping gestures, and the like. One of ordinary skill in the art will appreciate the various ways a user may interact with graphical user interface.

Still referring to FIG. 1, in some embodiments, apparatus 100 may display predicted user input through GUI 108. A "predicted user input" as used in this disclosure is an estimate of data entry based on previous data entries from a user. Predicted user input may include, without limitation, text entries, icon selections, window generations, and the like. In some embodiments, predicted user input may include, without limitation, addresses, names, dates, transport component data, times, and the like. As a non-limiting example, predicted user input may include an address of "123 Apple Lane" in an address bar of GUI 108. Predicted user input may be generated through a predictive input generator. A "predictive input generator" as used throughout this disclosure is software that outputs predicted input. A predictive input generator may include, without limitation, a program that builds a library of textual elements over a period of time. Each textual element of a library of textual elements may be assigned a score by determining a probability of a user typing a word and/or phrase associated with the textual elements. In some embodiments, GUI 108 and/or other GUIs as described throughout this disclosure may display predicted user input. In some embodiments, GUI 108 and/or other GUIs throughout this disclosure may provide options for a user to accept predicted user input, ignore predicted user input, and/or reject predicted user input. A predictive user input generator may update predicted user input generation as a function of an acceptance, ignoring, and/or rejection of predicted user input from a user. In some embodiments, a predictive input generator may generate predicted user input through a predicted user input machine learning model. A predicted user input machine learning model may be trained with training data correlating user input to predictive user input. Training data may be received through external computing devices, user input, and/or previous iterations of processing. A predicted user input machine learning model may input user input and output predicted user input. Any GUI throughout this disclosure may utilize a predicted user input machine learning model and/or predictive input generator, without limitation. In some embodiments, apparatus 100 may display user input predictions to a user through GUI 108. User input predictions may include, but are not limited to, predictive text of text fields of GUI 108. In some embodiments, apparatus 100 may utilize a transport data machine learning model to predict transport data 112. A transport data machine learning model may be trained on training data correlating transport data to predicted transport data. Training data may be received from user input, external computing devices, and/or previous iterations of processing. A transport data machine learning model may be configured to input transport data and output predicted transport data. For instance and without limitation, a transport data machine learning model may receive a carrier name from user input and output one or more dates, times, transport components, and the like.

Continuing to refer to FIG. 1, GUI 108 may be configured to be displayed on, but not limited to, smartphones, tablets, monitors, laptops, and the like. GUI 108 may include multi-part display window 128. A "multi-part display window" as used in this disclosure is a content viewing portion of a display having one or more subparts. Multi-part display window 128 may include, without limitation, frames, content layers, container windows, browser windows, dialog boxes, menu bars, context manus, widgets, tables, and the like. Multi-part display window 128 may include two or more rectangular shaped windows of a same size, different size, and the like. Multi-part display window 128 may include, but is not limited to, two or more windows of a same shape, differing shape, and the like. Shapes may include, but are not limited to, rectangles, squares, circles, ovals, triangles, hexagons, and the like. In some embodiments, multi-part display window 128 may add and/or remove windows as a function of user interaction. For instance, and without limitation, a user may click on an icon displayed in multi-part display window 128, which may generate another window in multi-part display window 128. As another non-limiting example, a user may click on an icon of multi-part display window 128 which may remove or minimize a window displayed through multi-part display window 128.

Still referring to FIG. 1, in some embodiments, GUI 108 may be configured to display transport data 112. "Transport data" as used in this disclosure is information pertaining to a movement of one or more objects, entities, and/or vehicles. Transport data 112 may include data of one or more carriers. A "carrier" as used in this disclosure is an entity that transports one or more objects between destinations. Data of one or more carriers of transport data 112 may include, but is not limited to, carrier identification codes, carrier entity names, and the like. Transport data 112 may include data of one or more vehicles. Vehicles may include, but are not limited to, cars, trucks, motorcycles, electric vehicles, drones, bicycles, and the like. Vehicle data of transport data 112 may include, but is not limited to, vehicle identification codes, vehicle categories, vehicle status, and the like. A vehicle status may include, but is not limited to, "in transit", "ready", "refueling", and the like. In some embodiments, transport data 112 may include data of one or more transport components. A "transport component" as used in this disclosure is an object or objects configured to move between two or more locations. A transport component may include, but is not limited to, construction materials, consumer electronics, food, and the like. Transport data 112 may include transport component data. "Transport component data" as used throughout this disclosure is information pertaining to components of a transport. Transport component data may include, without limitation, dimensions, weights, values, fragility statuses, hazard material status, expedited statuses, identification numbers, and the like. In some embodiments, transport components may be classified to one or more transport component classifications. "Transport component classifications" as used throughout this disclosure are categories and/or subcategories of transport components. Transport component classifications may include, without limitation, food, electronics, construction materials, perishables, hazardous materials, freight components, palette components, and the like. Transport components may be classified using a transport component classifier. A transport component classifier may be trained with training data correlating transport components to one or more groups and/or subgroups of transport components. Training data may be received through user input, external computing devices, and/or previous iterations of processing. In some embodiments, transport data 112 may include one or more transport dates. A transport date may include, but is not limited to, a date of a transport initiation, a date of a transport departure, a date of a transport arrival, a time period for completing a transport, and the like. Transport data 112 may include transport destinations, such as but not limited to addresses, GPS coordinates, and the like. Transport data 112 may include transport types. Transport types may include, but are not limited to, parcel, freight, hazardous, and the like. Transport data 112 may include transport costs. Transport costs may include fuel costs, transport component costs, carrier service costs, and/or any other monetary value associated with a transport. and the like. In some embodiments, apparatus 100 may be configured to generate a unique transport identifier. A "unique transport identifier" as used in this disclosure is a combination of characters and/or symbols corresponding to a transport.

Still referring to FIG. 1, in some embodiments, GUI 108 may be configured to display transport data 112 in a form of a data table. As a non-limiting example, columns of a data table of GUI 108 may include headings such as "Carrier", "Destination", and the like, and rows of the data column may include data related to the headings. GUI 108 may include verification module 116. A "verification module" as used in this disclosure is software configured to validate data. As used in this disclosure, "validation" is a process of ensuring that which is being "validated" complies with stakeholder expectations and/or desires. Stakeholders may include users, administrators, property owners, customers, and the like. In some cases, at least a machine-learning process, for example a machine-learning model, may be used to validate data through apparatus 104. Apparatus 104 may use any machine-learning process described in this disclosure for this or any other function. Validating data may include analyzing data for correctness. "Correctness" as used throughout this disclosure is acceptable data. Acceptable data may include, without limitation, proper spelling, accurate geographical locations, proper grammar, and the like. For example, and without limitation, acceptable data may include "19 Morningside Dr, Eagle Grove, Iowa" whereas unacceptable data may include "546 Snake Hill St. Detroit, MI" which is not a real address. Correctness may include, without limitation, properly spelled names, addresses, times, dates, and the like. For instance and without imitation, correct data may include "May 31, 2022" whereas incorrect data may include "May 32, 2022". Verification module 116 may be configured to analyze user input of a user. User input may include, but is not limited to, text entries, clicking icons, drag and drop functions, and the like. Verification module 116 may compare one or more data entries of a user to a transport database. As a non-limiting example, a user may input an address which verification module 116 may determine is invalid by comparing the address to a carrier database, such as USPS. Verification module 116 may be configured to verify data such as, but not limited to, addresses, carrier names, dates, and the like. Verification module 116 may be updated to include new valid and/or correct data, which may be received from an external computing device, user input, and/or previous iterations of processing. In some embodiments, apparatus 104 may check transport component data for validity. Apparatus 104 may compare transport component data to one or more databases for accuracy. As a non-limiting example, transport component data may be received from user input that may show a package of bananas having a dimension of 10 feet long. Apparatus 104 may search through one or more databases and/or other data structures, such as without limitation data structures such as indices generated using a web-crawler function or the like, to determine if this data is accurate. Apparatus 104 may determine a package of bananas having a dimension of 10 feet long is an inaccurate data entry and may recommend and/or suggest changing the data entry of the package of bananas to a user through GUI 108. In some embodiments, apparatus 104 may utilize a transport data correctness machine learning model. A transport data correctness machine learning model may be trained with training data correlating transport data to correct and/or incorrect categories. Training data may be received through user input, external computing devices, and/or previous iterations of processing. Apparatus 104 may utilize a transport data correctness machine learning model to input transport data and output correct and/or incorrect categories of the transport data.

Still referring to FIG. 1, GUI 108 may include error prevention module 120. An "error prevention module" as used in this disclosure is software and/or hardware configured to limit user input. Error prevention module 120 may be configured to communicate with verification module 116. Error prevention module 120 may determine an error of user input of a user from verification module 116. Error prevention module 120 may restrict access of one or more functions of GUI 108 based on detected errors from a user. As a non-limiting example, a user may input an invalid address which may be communicated to error prevention module 120 through verification module 116. Error prevention module 120 may generate a warning icon, popup message, highlight an area of GUI 108, and the like. Error prevention module 120 may indicate a reason for an error through GUI 108. As a non-limiting example, error prevention module 120 may detect an invalid carrier name and generate a red exclamation mark next to the invalid carrier name and a text box stating, "invalid carrier". In some embodiments, GUI 108 may include a transitional button. A "transitional button" as used in this disclosure is a graphical icon configured to present new data in a separate window, for instance and without limitation by triggering an event handler. GUI 108 may generate a transitional button in a form of, but not limited to, a text box, arrow, check mark, and the like. A transitional button of GU 108 may be configured to generate a secondary display window from a first display window of GUI 108. A secondary display window may be configured to display additional transport data, user input fields, and the like. In some embodiments, a first display window of GUI 108 may be verified by verification module 116. A user may click on or otherwise engage with a transitional button presented through GUI 108. Error prevention module 120 may be configured to restrict access to one or more parts of a first display window of GUI 108 as a function of an engagement of a transitional button. Restricting access may include, but is not limited to, making one or more user input fields of a first display window uneditable. Error prevention module 120 may gray out one or more user input fields of a first display window that may indicate to a user the user input fields are uneditable. In some embodiments, GUI 108 may generate a second transitional button upon engagement with a first transitional button. As a non-limiting example, a transitional button may include a text box saying "Next", which once clicked grays out a first display window and generates a second transitional button including a second text box saying "Unlock". A user may engage a second transitional button saying "Unlock" which may allow a first display window to become editable once again. Error prevention module 120 may manage user access of elements of GUI 108 as a function of engagement with one or more transitional buttons.

Still referring to FIG. 1, GUI 108 may be configured to display transport recommendation 124. A "transport recommendation" as used in this disclosure is guidance pertaining to one or more transport requests. A "transport request" as used in this disclosure is an initiation of a relocation of one or more objects. Transport requests may include transport parameters. "Transport parameters" as used in this disclosure are variables associated with a transport request. Transport parameters may include, without limitation, costs, times, fuel, quantity of carriers, transport component classifications, and the like. In some embodiments, apparatus 100 may determine transport recommendation 124 as a function of one or more transport parameters of one or more transport requests. Apparatus 100 may determine transport recommendation 124 and display it through GUI 108. Transport recommendation 124 may include, but is not limited to, transport times, carriers, ordering of multiple transports, transport destinations, combining of two or more transports, and the like. Apparatus 100 may use a recommendation machine learning model to generate transport recommendation 124. A recommendation machine learning model may be trained on training data correlating transport requests to transport recommendations. Training data may be received through user input, remote computing devices, and/or previous iterations of processing. Apparatus 100 may update GUI 108 to display transport recommendation 124 as a function of user input. GUI 108 may present transport recommendation 124 to a user along with a user input field. A user may reject transport recommendation 124. Apparatus 100 may receive user input indicating a rejection of transport recommendation 124 and update transport recommendation 124. This process may occur indefinitely until a user accepts transport recommendation 124. In some embodiments, a user may reject transport recommendation 124 which may be removed from GUI 108.

Still referring to FIG. 1, apparatus 100 may be configured to generate a transport request optimization model. A transport request optimization model may include an optimization model. An optimization model may include an optimization criterion. An "optimization criterion" as used in this disclosure is a value that is sought to be maximized or minimized in a process. An optimization criterion may include any description of a desired value or range of values for one or more attributes of an oral aid; desired value or range of values may include a maximal or minimal value, a range between maximal or minimal values, or an instruction to maximize or minimize an attribute. As a non-limiting example, an optimization criterion may specify that a cost of transport should be minimized, for instance by minimizing resources used in a transport request; an optimization criterion may limit a transport time, for instance specifying that a transport must be completed before a certain date or time, or within a certain period of time. An optimization criterion may alternatively request that a transport time be greater than a certain value. An optimization criterion may specify one or more tolerances for precision in a route of a transport. An optimization criterion may specify one or more desired cost attributes for a transport. In an embodiment, at least an optimization criterion may assign weights to different attributes or values associated with attributes; weights, as used herein, may be multipliers or other scalar numbers reflecting a relative importance of a particular attribute or value. One or more weights may be expressions of value to a user for a particular outcome, attribute value, or other facet of a transport request; value may be expressed, as a non-limiting example, in remunerative form, such as a quantity of a medium of exchange, a monetary unit, or the like. As a non-limiting example; minimization of transport cost may be multiplied by a first weight, while tolerance above a certain value may be multiplied by a second weight. Optimization criteria may be combined in weighted or unweighted combinations into a function reflecting an overall outcome desired by a user; function may be a cost function to be minimized and/or maximized. Function may be defined by reference to transport constraints and/or weighted aggregation thereof as provided by a plurality of remote computing devices; for instance, a cost function combining optimization criteria may seek to minimize or maximize a function of transport constraints. As a non-limiting example, a cost function combining optimization criteria may seek to minimize transport times. As another non-limiting example, a cost function combining optimization criteria may seek to maximize a quantity of transport components delivered.

Still referring to FIG. 1, apparatus 100 may use a transport request optimization model to compare a first transport recommendation to a second transport recommendation. Generation of a transport request optimization model may include generation of a function to score and weight factors to achieve a process score for each feasible pairing. In some embodiments, pairings may be scored in a matrix for optimization, where columns represent transport requests and rows represent transport recommendations potentially paired therewith; each cell of such a matrix may represent a score of a pairing of the corresponding transport recommendation to the corresponding transport request. In some embodiments, assigning a predicted process that optimizes the objective function includes performing a greedy algorithm process. A "greedy algorithm" is defined as an algorithm that selects locally optimal choices, which may or may not generate a globally optimal solution. For instance, a transport recommendation optimization model may select pairings so that scores associated therewith are the best score for each transport request and/or for each transport recommendation. In such an example, optimization may determine the combination of transport requests such that each transport recommendation pairing includes the highest score possible.

Still referring to FIG. 1, a transport recommendation optimization model may be formulated as a linear objective function. A transport recommendation optimization model may solve an objective function using a linear program such as without limitation a mixed-integer program. A "linear program," as used in this disclosure, is a program that optimizes a linear objective function, given at least a constraint. For instance, and without limitation, objective function may seek to maximize a total score $\Sigma_{r \in R} \Sigma_{s \in S} c_{rs} x_{rs}$, where R is a set of all transport requests r, S is a set of all transport recommendations s, $c_{rs}$ is a score of a pairing of a given transport request with a given transport recommendation, and $x_{rs}$ is 1 if a transport request r is paired with a transport recommendation s, and 0 otherwise. Continuing the example, constraints may specify that each transport recommendation is assigned to only one transport request, and each transport request is assigned only one transport recommendation. Transport recommendations may include transport recommendations as described above. Sets of transport recommendations may be optimized for a maximum score combination of all generated transport requests. In various embodiments, a transport recommendation optimization model may determine a combination of transport recommendations that maximizes a total score subject to a constraint that all transport recommendations are paired to exactly one transport request. Not all transport requests may receive a transport recommendation pairing since each transport requests may only receive one transport recommendation. A mathematical solver may be implemented to solve for the set of feasible pairings that maximizes the sum of scores across all pairings; mathematical solver may be implemented on apparatus 100 and/or another device in system 100, and/or may be implemented on third-party solver.

With continued reference to FIG. 1, a transport recommendation optimization model may include minimizing a loss function, where a "loss function" is an expression an output of which an optimization model minimizes to generate an optimal result. As a non-limiting example, an oral aid optimization model may assign variables relating to a set of parameters, which may correspond to score transport recommendations as described above, calculate an output of mathematical expression using the variables, and select a pairing that produces an output having the lowest size, according to a given definition of "size," of the set of outputs representing each of a plurality of candidate transport recommendations; size may, for instance, included absolute value, numerical size, or the like. Selection of different loss functions may result in identification of different potential pairings as generating minimal outputs. Objectives represented in an objective function and/or loss function may include minimization of cost. Objectives may include minimization of transport time. Objectives may include minimization of carriers and/or resources used. Apparatus 100 may use a machine-learning model to generate optimization criteria and/or objective functions. A machine-learning model may be as described with reference to FIG. 9. In some embodiments, apparatus 100 may use a fuzzy inference engine to infer transport data, as described below with reference to FIG. 2.

Figure 2:
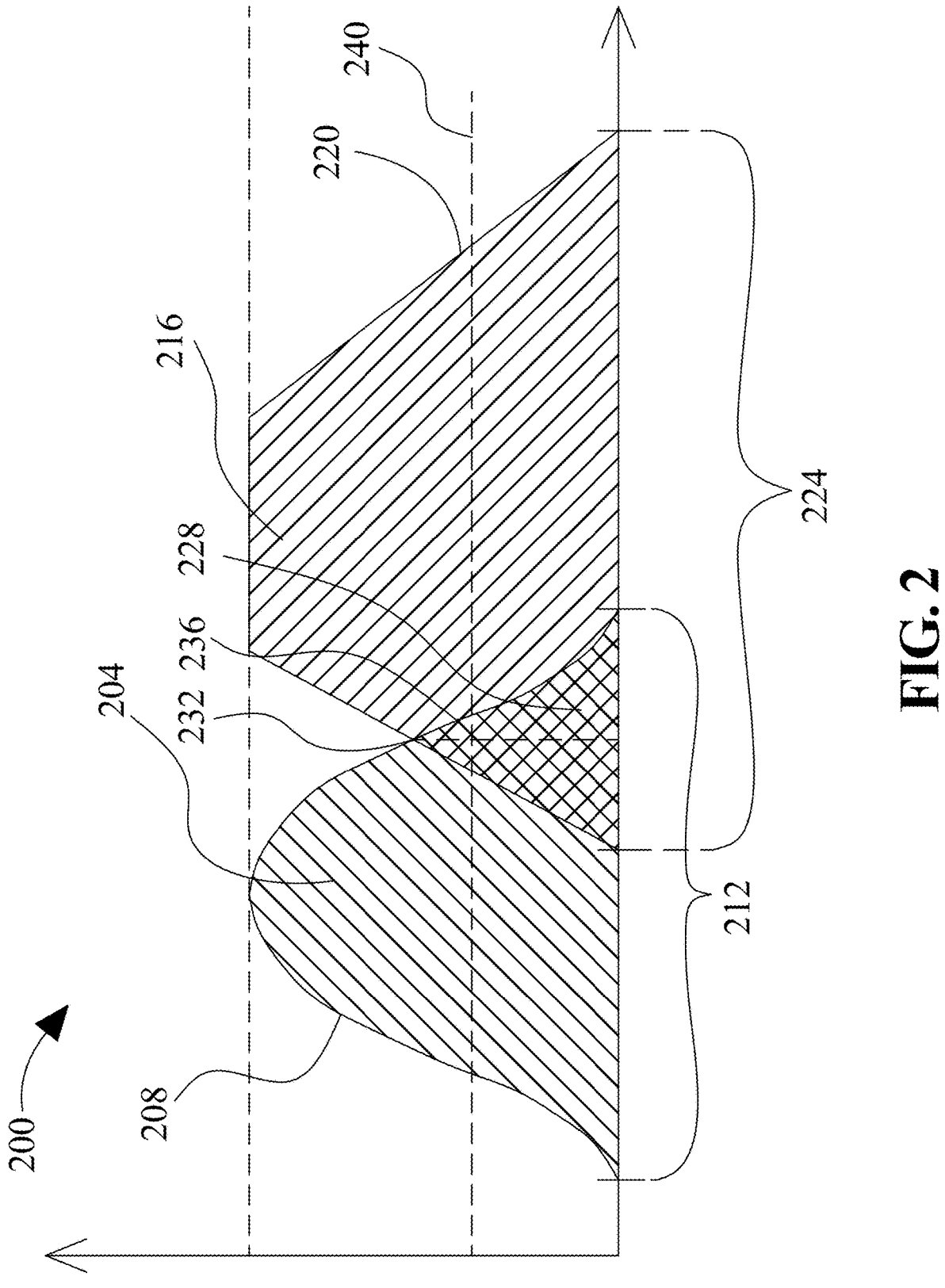
FIG. 2 illustrates an exemplary embodiment of a fuzzy inference system.

Referring now to FIG. 2, an exemplary embodiment of fuzzy set comparison 200 is illustrated. A first fuzzy set 204 may be represented, without limitation, according to a first membership function 208 representing a probability that an input falling on a first range of values 212 is a member of the first fuzzy set 204, where the first membership function 208 has values on a range of probabilities such as without limitation the interval [0,1], and an area beneath the first membership function 208 may represent a set of values within first fuzzy set 204. Although first range of values 212 is illustrated for clarity in this exemplary depiction as a range on a single number line or axis, first range of values 212 may be defined on two or more dimensions, representing, for instance, a Cartesian product between a plurality of ranges, curves, axes, spaces, dimensions, or the like. First membership function 208 may include any suitable function mapping first range 212 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, \text{ for } x > c \text{ and } x < a \\ \dfrac{x-a}{b-a}, \text{ for } a \leq x < b \\ \dfrac{c-x}{c-b}, \text{ if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}\left(\frac{x-c}{\sigma}\right)^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

Still referring to FIG. 2, first fuzzy set 204 may represent any value or combination of values as described above, including output from one or more machine-learning models and transport data, a predetermined class, such as without limitation transport recommendations. A second fuzzy set 216, which may represent any value which may be represented by first fuzzy set 204, may be defined by a second membership function 220 on a second range 224; second range 224 may be identical and/or overlap with first range 212 and/or may be combined with first range via Cartesian product or the like to generate a mapping permitting evaluation overlap of first fuzzy set 204 and second fuzzy set 216. Where first fuzzy set 204 and second fuzzy set 216 have a region 228 that overlaps, first membership function 208 and second membership function 220 may intersect at a point 232 representing a probability, as defined on probability interval, of a match between first fuzzy set 204 and second fuzzy set 216. Alternatively, or additionally, a single value of first and/or second fuzzy set may be located at a locus 236 on first range 212 and/or second range 224, where a probability of membership may be taken by evaluation of first membership function 208 and/or second membership function 220 at that range point. A probability at 228 and/or 232 may be compared to a threshold 240 to determine whether a positive match is indicated. Threshold 240 may, in a non-limiting example, represent a degree of match between first fuzzy set 204 and second fuzzy set 216, and/or single values therein with each other or with either set, which is sufficient for purposes of the matching process; for instance, threshold may indicate a sufficient degree of overlap between an output from one or more machine-learning models and/or transport data and a predetermined class, such as without limitation transport recommendations for combination to occur as described above. Alternatively, or additionally, each threshold may be tuned by a machine-learning and/or statistical process, for instance and without limitation as described in further detail below.

Further referring to FIG. 2, in an embodiment, a degree of match between fuzzy sets may be used to classify transport data with a transport recommendation. For instance, if transport data has a fuzzy set matching a transport recommendation fuzzy set by having a degree of overlap exceeding a threshold, apparatus 100 may classify the transport data as belonging to the transport recommendation. Where multiple fuzzy matches are performed, degrees of match for each respective fuzzy set may be computed and aggregated through, for instance, addition, averaging, or the like, to determine an overall degree of match.

Still referring to FIG. 2, in an embodiment, transport data may be compared to multiple transport recommendation fuzzy sets. For instance, transport data may be represented by a fuzzy set that is compared to each of the multiple transport recommendation fuzzy sets; and a degree of overlap exceeding a threshold between the transport data fuzzy set and any of the multiple transport recommendation fuzzy sets may cause apparatus 100 to classify the transport data as belonging to transport recommendation. For instance, in one embodiment there may be two transport recommendation fuzzy sets, representing respectively a first transport recommendation and a second transport recommendation. First transport recommendation may have a first fuzzy set; Second transport recommendation may have a second fuzzy set; and transport data may have a transport fuzzy set. Apparatus 100, for example, may compare a transport data fuzzy set with each of first transport recommendation fuzzy set and second transport recommendation fuzzy set, as described above, and classify transport data to either, both, or neither of a first transport recommendation or a second transport recommendation. Machine-learning methods as described throughout may, in a non-limiting example, generate coefficients used in fuzzy set equations as described above, such as without limitation x, c, and $\alpha$ of a Gaussian set as described above, as outputs of machine-learning methods. Likewise, transport data may be used indirectly to determine a fuzzy set, as a transport data fuzzy set may be derived from outputs of one or more machine-learning models that take the transport data directly or indirectly as inputs.

Still referring to FIG. 2, a computing device may use a logic comparison program, such as, but not limited to, a fuzzy logic model to determine a transport recommendation score. A transport recommendation score may include, but is not limited to, below average, average, great, excellent, and the like; each such transport recommendation score may be represented as a value for a linguistic variable representing a transport recommendation score or in other words a fuzzy set as described above that corresponds to a degree of match between a transport recommendation and a transport request, as calculated using any statistical, machine-learning, or other method that may occur to a person skilled in the art upon reviewing the entirety of this disclosure. In other words, a given element of transport data may have a first non-zero value for membership in a first linguistic variable value such as "1" and a second non-zero value for membership in a second linguistic variable value such as "7". In some embodiments, determining a transport recommendation score may include using a linear regression model. A linear regression model may include a machine learning model. A linear regression model may be configured to map data of transport data such as transport component data, destinations, transport paths, cost thresholds, and the like, to one or more transport recommendation scores. A linear regression model may be trained using training data correlating elements of transport data to transport recommendation scores. A linear regression model may map statistics such as, but not limited to, carrier performances such as, but not limited to, on-time percentages, missed transports, average transport costs, and the like. In some embodiments, determining a transport recommendation score of transport data may include using a transport recommendation score classification model. A transport recommendation score classification model may be configured to input collected data and cluster data to a centroid based on, but not limited to, frequency of appearance, linguistic indicators of transport recommendations, and the like. Centroids may include scores assigned to them such that elements of transport data may each be assigned a score. In some embodiments, a transport recommendation score classification model may include a K-means clustering model. In some embodiments, a transport recommendation score classification model may include a particle swarm optimization model. In some embodiments, determining a transport recommendation score of transport data may include using a fuzzy inference engine. A fuzzy inference engine may be configured to map one or more transport data elements using fuzzy logic. In some embodiments, a plurality of entity assessment devices may be arranged by a logic comparison program into transport recommendation score arrangements. A "transport recommendation score arrangement" as used in this disclosure is a grouping of metric values assigned to transport recommendations based on transport data. This step may be implemented as described above in FIG. 1. Membership function coefficients and/or constants as described above may be tuned according to classification and/or clustering algorithms. For instance, and without limitation, a clustering algorithm may determine a Gaussian or other distribution of transport recommendation scores about a centroid corresponding to a given level, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Further referring to FIG. 2, an inference engine may be implemented according to input and/or output membership functions and/or linguistic variables. For instance, a first linguistic variable may represent a first measurable value pertaining to a transport path, such as a degree of complexity of a transport path while a second membership function may indicate a degree of displacement of a subject thereof, or another measurable value pertaining to transport data. Continuing the example, an output linguistic variable may represent, without limitation, a score value. An inference engine may combine rules, such as: "if the transport path displacement is 'high and the transport path route level is 'complex', the transport path score is 'high'"—the degree to which a given input function membership matches a given rule may be determined by a triangular norm or "T-norm" of the rule or output membership function with the input membership function, such as min (a, b), product of a and b, drastic product of a and b, Hamacher product of a and b, or the like, satisfying the rules of commutativity (T(a, b)=T(b, a)), monotonicity: (T(a, b)≤T(c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥" such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively, or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively, or additionally, output rules may be replaced with functions according to the Takagi-Sugeno-King (TSK) fuzzy model.

Further referring to FIG. 2, transport data to be used may be selected by user selection, and/or by selection of a distribution of output scores, such as 30% average, 40% good, and 30% excellent scores or the like. Each score may be selected using an additional function such as complexity as described above.

Figure 3:
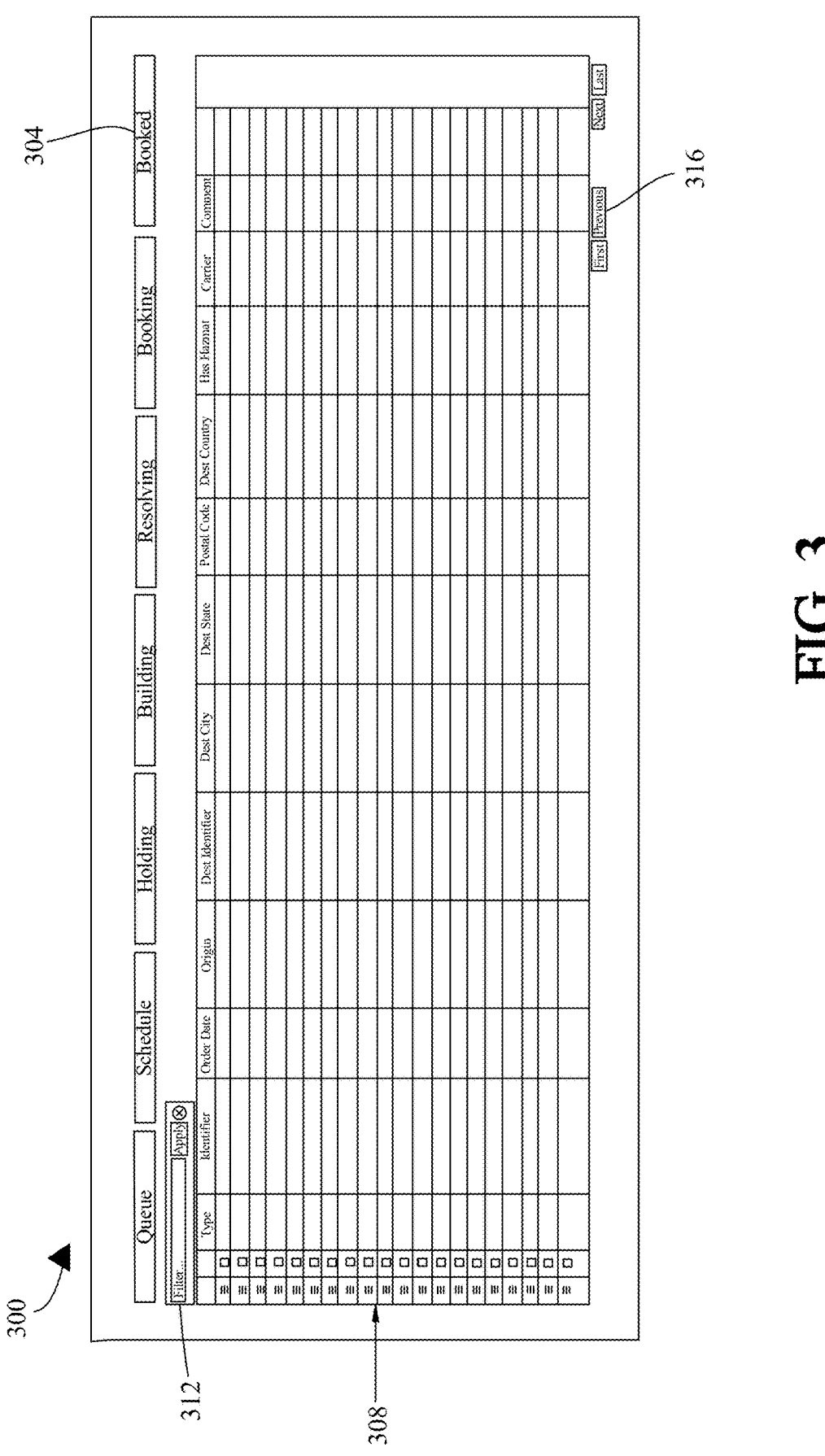
FIG. 3 illustrates an exemplary embodiment of a graphical user interface.

Referring now to FIG. 3, an exemplary embodiment of a graphical user interface (GUI) 300 is shown. GUI 300 may be configured to display transport data, such as through table 308. "Transport data" as used in this disclosure is information pertaining to entities and/or objects involved in moving one or more components between locations. Transport data may include, but is not limited to, departure times, arrival times, destinations, origins, transport component dimensions, and the like. GUI 300 may be configured to display a status of one or more transports through table 308. Table 308 may include one or more columns. Columns may include one or more headers that may identify a column attribute. Columns of table 308 may include, but are not limited to, "type", "identifier", "order date", "origin", "dest identifier", "dest city", "dest state", "dest postal code", "dest country", has hazmat", "carrier", and/or "comment". Table 308 may include one or more rows that may include data related to a header of a column. As a non-limiting example, under "identifier" of a column header of table 308, a row may recite a transport code of "ORD0315245408". GUI 300 may include a filter icon 312. Filter icon 312 may include a text field box that may be configured to receive user input. Filter icon 312 may be configured to filter transport data as a function of user input. In some embodiments, filtering transport data may include comparing transport data to one or more filter criterion. A "filtering criterion" as used in this discourse is a value constraining a displaying of transport data. Filtering criterion may include, without limitation, dates, names, addresses, transport component classifications, cost ranges, and the like. Filter icon 312 may be configured to update table 308 as a function of one or more parameters received from a user. As a non-limiting example, a user may enter a date of Aug. 7, 2021, into filter icon 312. A user may click on an "apply" icon of filter icon 312, which may update table 308 to show only transports ordered on Aug. 7, 2021. GUI 300 may include status tabs 304. Status tabs 304 may be configured to identify phase of a completion a transport is currently in. Status tabs 304 may include, but are not limited to, "Queue", "Schedule", "Holding", "Building", "Resolving", "Booking", and/or "Booked". A tab of status tabs 304 may be colored and/or shaded differently than the rest of status tabs 304 to indicate which phase of a completion each transport of table 308 may be presented in. In some embodiments, status tabs 304 may include a hover over feature. A "hover over feature" as used in this disclosure is an ability of an icon to present additional data when a mouse is positioned over the icon. Status tabs 304 may change colors when a user hovers a cursor over them. A user may click on a tab of status tabs 304 which may present transport data according to a heading of a status tab of status tabs 304. As a non-limiting example, a user may click on a "holding" tab of status tabs 304 which may update table 308 to only show transport currently in holding. GUI 300 may present table directors 316. Table directors 316 may include, but are not limited to, "First", "Previous", "Next", and/or "Last". A user may click on a table director of table directors 316 to present various tables 308. As a non-limiting example, a user may click on a "Next" icon of table directors 316 which may refresh table 308 to a subsequent table. In some embodiments, table directors may be configured to update table 308 corresponding to status tabs 304. For instance, and without limitation, table 308 may display data under a "Queue" tab of status tabs 304. A user may click a "Next" icon of table directors 316, which may update table 308 to display data under a "Schedule" tab of status tabs 304.

Figure 4:
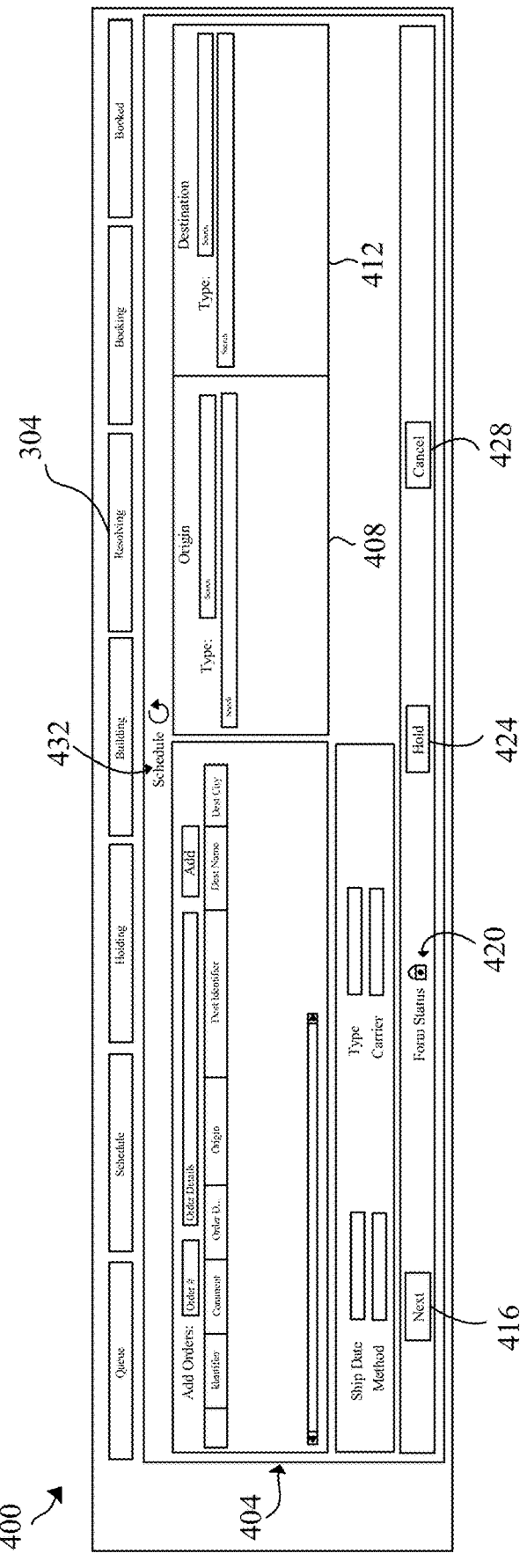
FIG. 4 illustrates an exemplary embodiment of a multi-part display window.

Referring now to FIG. 4, another embodiment of a GUI 400 is presented. GUI 400 may include status tabs 304 as described above in FIG. 3. GUI 400 may include multi-part display window 404. A "multi-part display window" as used in this disclosure is a frame of information having one or more subparts. Multi-part display window 404 may include two or more rectangular shaped windows of a same size, different size, and the like. Multi-part display window 404 may include, but is not limited to, two or more windows of a same shape, differing shape, and the like. Shapes may include, but are not limited to, rectangles, squares, circles, ovals, triangles, hexagons, and the like. In some embodiments, multi-part display window 404 may add and/or remove windows as a function of user interaction. For instance, and without limitation, multi-part display window may show additional windows if a user clicks on an "Add" icon. Likewise, multi-part display window 404 may remove a window if a user clicks a "cancel" button or an "x" button.

Still referring to FIG. 4, multi-part display window 404 may include a transport data table similar to table 308 as described above. A transport table of multi-part display window 404 may include transport data such as, but not limited to, types of carriers, destinations, originations, identifiers, addresses, and the like. Transport table 404 may include columns and rows, such as columns and rows of table 208 described in FIG. 2. In some embodiments, multi-part display window 404 may be configured to display include origin window 408 and/or destination window 412. An "origin window" as used throughout this disclosure is a portion of a display that shows originating transport data. Origin window 408 may include transport data relating to an origin of a transport, such as, but not limited to, Origin window 408 may include a search bar. A search bar of origin window 408 may be configured to receive text from a user. In some embodiments, a search bar of origin window 408 may be configured to generate predictive text as a function of a user input. Origin window 408 may include a drop-down menu. A drop-down menu may be configured to display additional options for user selection upon engagement. A drop-down menu of origin window 408 may be configured to display, but is not limited to displaying, "new", "search", and/or "select". Upon entry of an origin, origin window 408 may be configured to display an origin of a transport. A "destination window" as used throughout this disclosure is a display showing information relating to departing transport data. Destination window 412 may be configured similarly to origin window 408 but may instead display destinations of a transport instead of origins. In some embodiments, origin window 408 and/or destination window 412 may be configured to validate one or more addresses with an address database. An address database may include, but is not limited to, a transport entity database such as USPS. In some embodiments, origin window 408 and/or destination window 412 may generate error popups if an invalid address is detected. An error popup may prompt a user to proceed with an invalid address and/or suggest a validated address for user selection.

Still referring to FIG. 4, GUI 400 may include a transport addition icon. A transport addition icon may be configured to receive textual information from a user. A transport addition icon may include an order number field, order details field, and/or an "Add" icon. A user may input an order number and/or order details into a transport addition icon. Upon engagement with an "Add" icon of a transport addition icon, a transport may be added to a transport table of multi-part display window 404. A transport addition icon may be configured to display an error pop up if a user incorrectly enters order details and/or an order number. An error pop up may include, but is not limited to, a circle with an exclamation mark in a center of the circle. In some embodiments, GUI 400 may include a sliding icon. A sliding icon may include a rectangular shape configured to move in at least two directions, such as, but not limited to, left and right. Upon movement of a sliding icon, a table of multi-part display window 404 may show additional information of one or more transports. In some embodiments, multi-part display window 404 may be configured to display a core attribute table. A "core attribute table" as used in this disclosure is a display of transport data having high importance. A core attribute table may include, but is not limited to, a ship date table, transport type table, transport method table, and/or a carrier table. In some embodiments, multi-part display window 404 may include transitional button 416. Transitional button 416 may be configured to lock information entered in at least a table of multi-part display window 404, such as, but not limited to, origin window 408, and/or destination window 412. Multi-part display window 404 may include second transitional button 424. Second transitional button 424 may be configured to apply a status of status tabs 204 to one or more transports displayed in multi-part display window 404. In some embodiments, second transitional button 424 may display the word "Hold" to a user. Multi-part display window 404 may include a third transitional button 428. Third transitional button 428 may be configured to cancel and/or remove entries received from a user and displayed in multi-part display window 404.

Still referring to FIG. 4, in some embodiments, multi-part display window 404 may include refresh icon 432. A "refresh icon" as used in this disclosure is a graphical depiction corresponding to an updating of a display. Refresh icon 432 may be configured to update one or more display windows of multi-part display window 404. Multi-part display window 404 may include form status icon 420. A "form status icon" as used in this disclosure is a graphical element corresponding to an editability of a window. Form status icon 420 may include graphical depictions such as, but not limited to, a lock symbol, and unlock symbol, and the like. Form status icon 420 may communicate to a user that one or more sections of multi-part display window 404 are locked, such as, but not limited to, origin window 408 and/or destination window 412. In some embodiments, form status icon 420 may include an unlocked icon. An unlocked icon of form status icon 420 may indicate to a user that one or more user input fields of multi-part display window 404 may be editable. In some embodiments, form status icon 420 may include a locked icon. A locked icon may indicate to a user that one or more user input fields of multi-part display window 404 may not be editable. In some embodiments, uneditable parts of multi-part display window 404 may be colored gray to indicate a restriction of user access to that part of multi-part display window 404.

Figure 5:
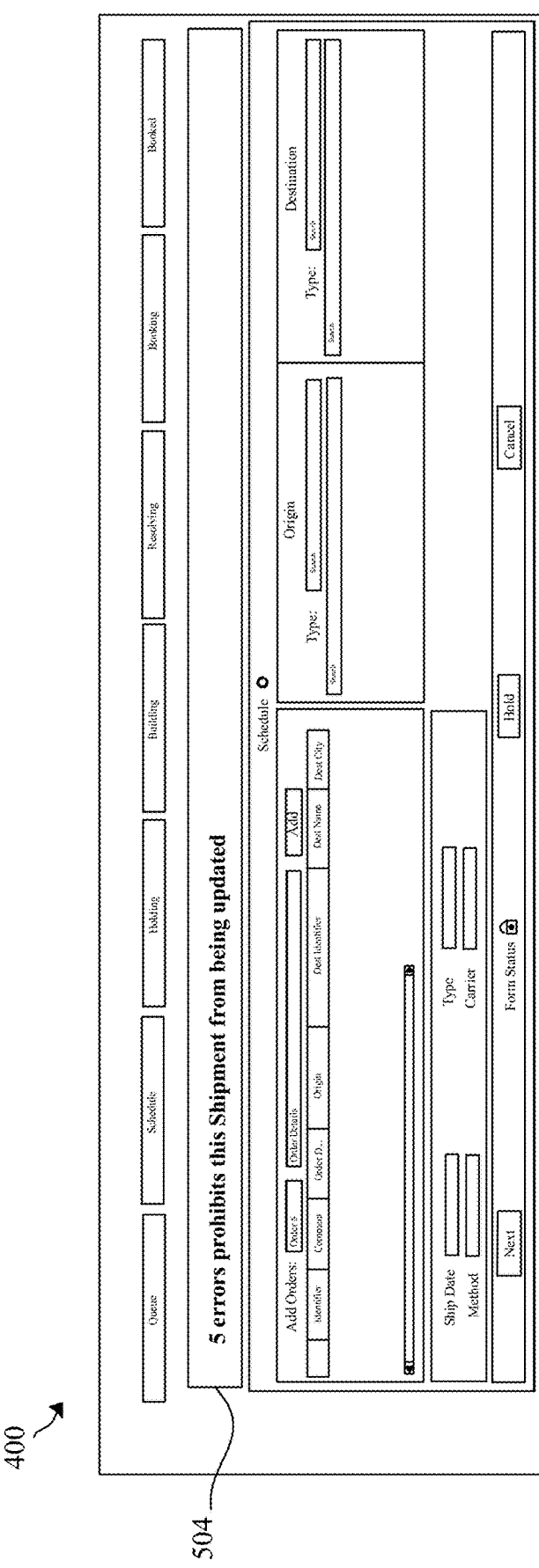
FIG. 5 illustrates an exemplary embodiment of an error prevention module.

Referring now to FIG. 5, another exemplary embodiment GUI 400 is shown. GUI 400 may be as described above in FIG. 4. In some embodiments, error prevention module 120 may be configured to display error message 504 through GUI 300. An "error message" as used in this disclosure is a visual indicator pertaining to invalid data. Error message 504 may include, but is not limited to, characters, text strings, icons, pop-up windows, and the like. In some embodiments, error message 504 may include a color that may contrast highly against GUI 300. For instance, and without limitation, error message 504 may include an orange rectangular box containing the phrase "5 errors prohibit this shipment from being updated". Error prevention module 120 may display a warning window to a user, which may be displayed, but is not limited to being displayed, under status tabs 304. Error message 504 may display a bulleted list of errors. For instance, and without limitation, error message 504 may display a list of invalid addresses, missing data, invalid data entries, or other forms of errors. Error message 504 may detail specific errors, such as specific text field entries of GUI 400. In some embodiments, error prevention module 120 may prohibit a user from accessing parts of GUI 400 if error message 504 is displayed. For instance, and without limitation, error prevention module 120 may display error message 504 and render a transitional button, such as a "Next" button, unclickable. In some embodiments, error prevention module 120 may identify specific text fields of GUI 400, which may include, but is not limited to, highlighting text, displaying contrasted symbols such as exclamation marks, underlining text, bolding text, and the like. As a non-limiting example, a user may enter an invalid address. Error prevention module 120 may display error message 504 which may include a phrase of "1 error prevents this shipment from being updated". In addition, an address field of GUI 400 may have its borders highlighted red and/or a red exclamation mark may be displayed next to the address field.

Figure 6:
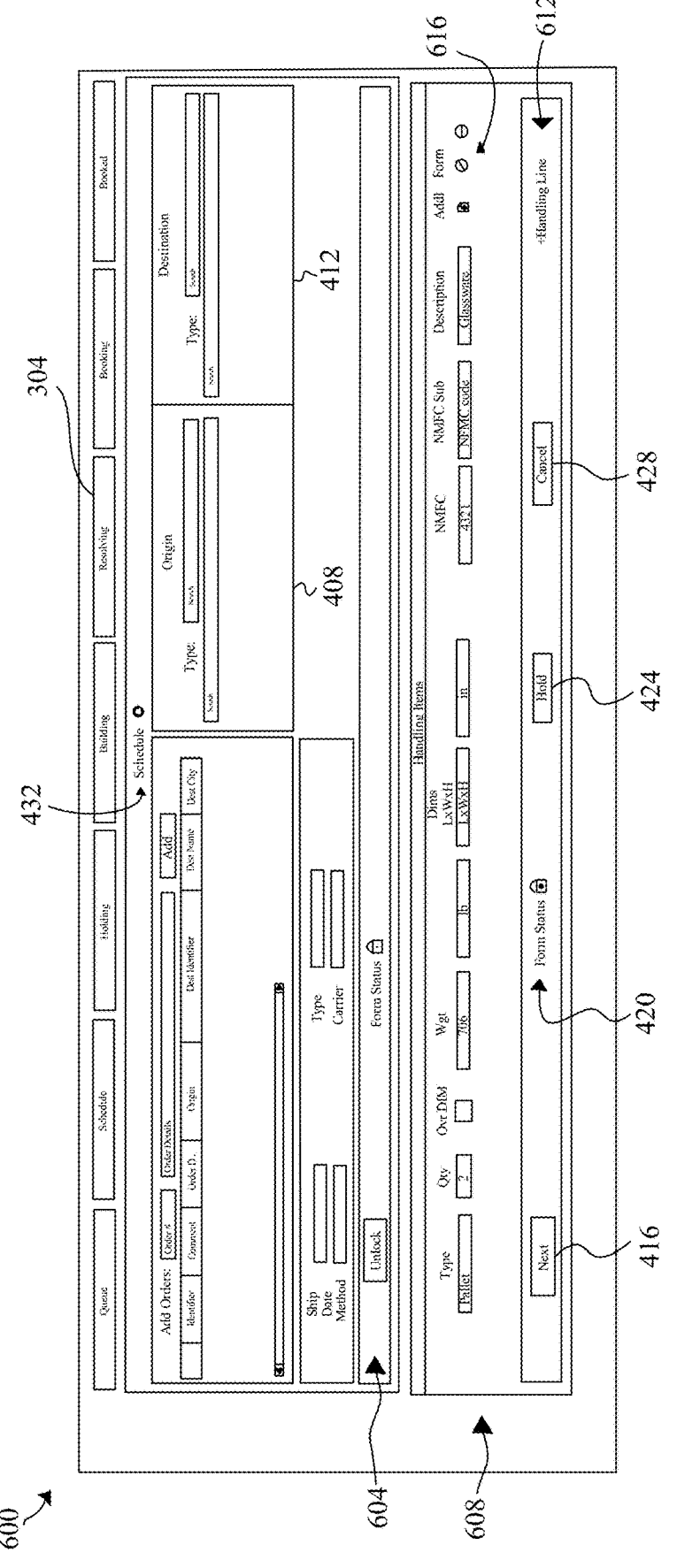
FIG. 6 illustrates another exemplary embodiment of a multi-part display window.

Referring now to FIG. 6, another exemplary embodiment of a GUI 600 is shown. GUI 600 may include one or more portions of GUI 400. In some embodiments, GUI 600 may include item window 608. An "item window" as used throughout this disclosure is a display showing data of transport items. In some embodiments, item window 608 may include transport component information of a transport. Transport component information may include transport component data of a grouping of transport components of a transport. For instance, and without limitation, item window 608 may display transport component information pertaining to a 40×48 pallet containing coffee beans. Item window 608 may be configured to display data of one or more items of a transport. In some embodiments, item window 608 may include, but is not limited to, item type display, quantity display, weight display, dimensional display, fulfillment center display, hazard display, national motor freight classification display, national motor freight classification subcode display, and/or add item display. Item window 608 may include a heading, such as, but not limited to, "Handling Items". In some embodiments, item window 608 may include item modifier icons 616. "item modifier icons" as used in this disclosure are graphical elements corresponding to changes of an item window. Item modifier icons 616 may include, but are not limited to, document-shaped icons, circular icons, and the like. Item modifier icons 616 may be configured to add transport components to item window 608 upon selection by a user. In some embodiments, item modifier icons 616 may be configured to remove elements from item window 608, such as transport component data. In some embodiments, item widow modifiers 616 may be configured to duplicate data of item window 608, such as transport component data. Item window 608 may include line addition icon 612. A "line addition icon" as used in this disclosure is a graphical element corresponding to an additive function of an item window. Line addition icon 612 may include words and/or phrases, such as, but not limited to, "+Handling Line". Line addition icon 612 may allow a user to add additional item windows to GUI 600 upon selection. In some embodiments, a selection of line addition icon 612 may generate a pop-up window with text fields for user input. A pop-up window may include text fields relating to palette level transport component data, such as, but not limited to, quantity, weight, description, dimensions, identifiers, categories, and the like. In some embodiments, GUI 600 may include status window 604. A "status window" as used in this disclosure is a display showing data of a status of a GUI. In some embodiments, status window 604 may include form status 420 as described above in FIG. 4. In some embodiments, status window 604 may include a transitional button displaying the word "Unlock". A transitional button of status window 604 may allow for a user to interact with and/or edit previously uneditable portions of GUI 600, such as tables, status tabs, origin window 408, destination window 412, and the like.

Figure 7:
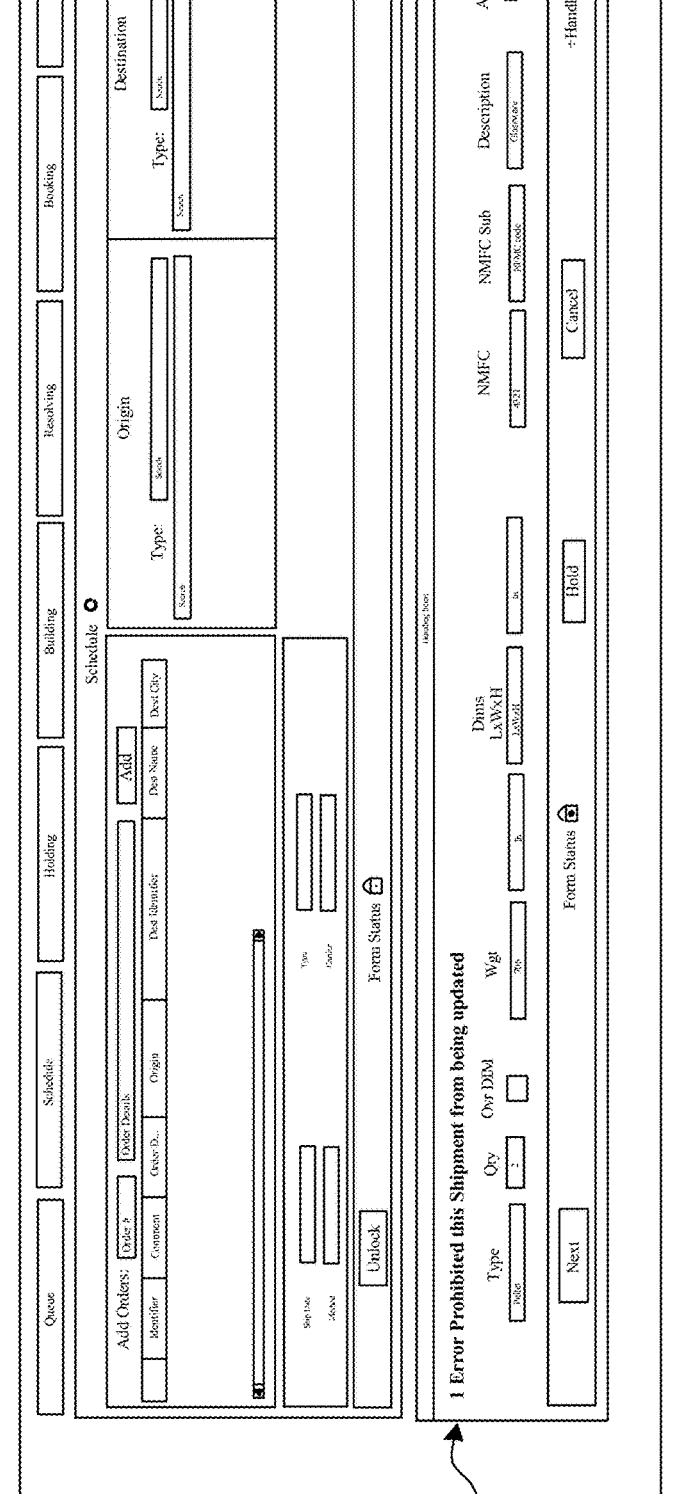
FIG. 7 illustrates another exemplary embodiment of an error prevention module.

Referring now to FIG. 7, another embodiment of GUI 600 is shown. GUI 600 may be configured to display error message 704 to a user. Error message 704 may include a pop-up window, text, and the like. In some embodiments, error message 704 may display a quantity of errors, type of error, and the like. In some embodiments, error message 704 may display a bulleted list of erroneous data inputs of GUI 600. Error message 704 may be specific to item window 608, which may include showing erroneous inputs of input window 608. In other embodiments, error message 704 may include errors throughout all of GUI 600. In some embodiments, error message 704 may be as described above with reference to error message 504 in FIG. 5.

Figure 8:
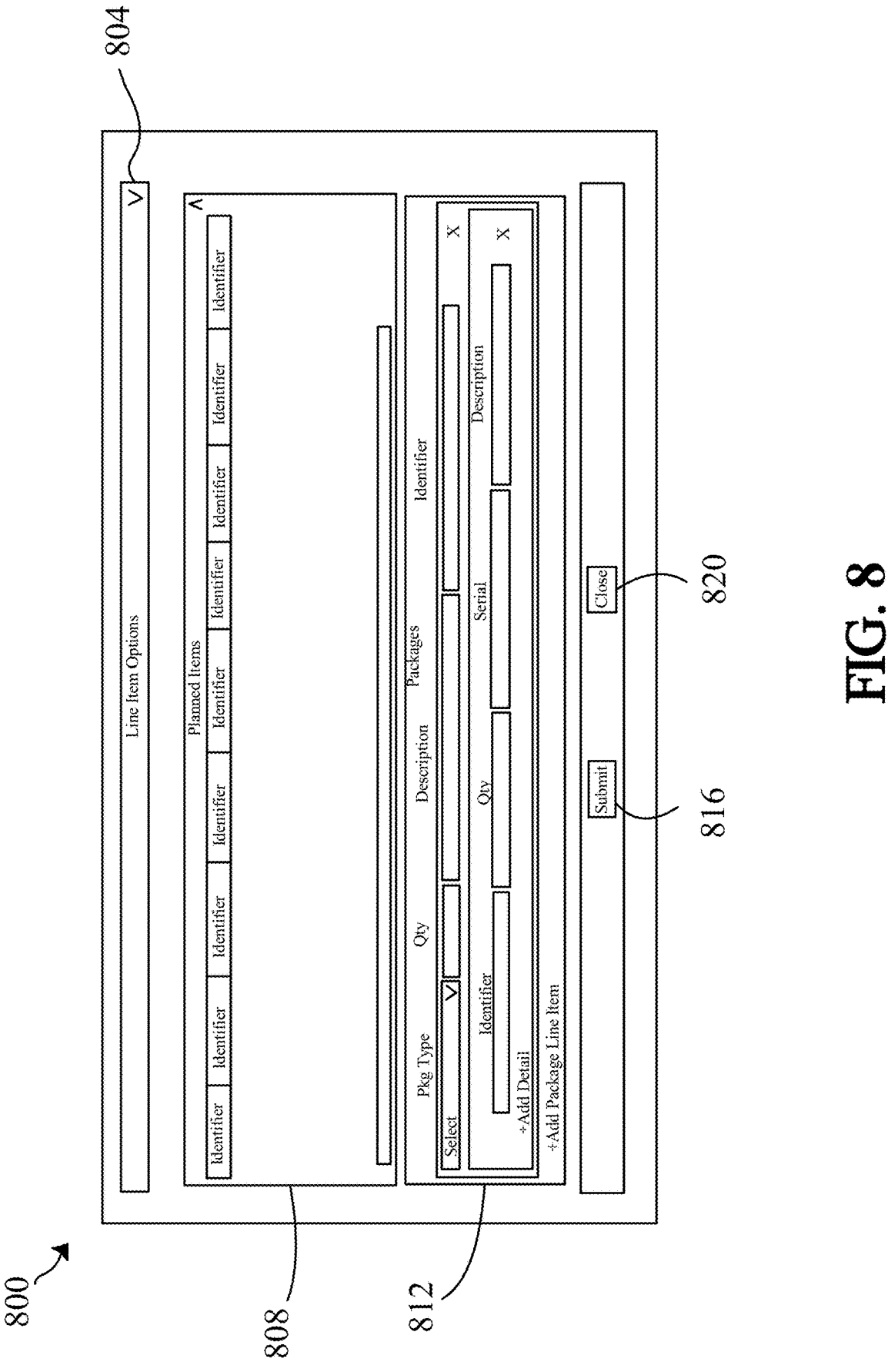
FIG. 8 illustrates another exemplary embodiment of a graphical user interface.

Referring now to FIG. 8, an embodiment of GUI 800 is presented. GUI 800 may include a line-item options window. A line-item options window may include a pop-up window generated by icons of GUI 500 above, such as line addition icon 512. GUI 800 may include a multi-part display window. In some embodiments, GUI 800 may include transport component table 808. Transport component table 808 may be configured to display, but is not limited to displaying, transport component identifiers, descriptions, assigned quantities, planned quantities, hazard data, and the like. Hazard data may include, but is not limited to, hazard identification numbers, hazard packages, hazard classes, hazard subclasses, hazard descriptions, and the like. In some embodiments, GUI 800 may include A slidable icon. A slidable icon may be configured to show additional information of transport component table 808 upon engagement. A slidable icon may include, but is not limited to, a rectangular bar. In some embodiments, GUI 800 may include transport component group table 812. Transport component group table 812 may be configured to display groupings of transport components, such as, but not limited to, packages, arrangements, and the like. Transport component group table 812 may display transport component group data such as, but not limited to, group types, group quantities, descriptions, identifiers, hazard indicators, and the like. In some embodiments, transport component group table 812 may be configured to display an "+Add Detail" icon. An "+Add Detail" icon may be configured to add user input fields to transport component group table 812 upon engagement. Transport component group table 812 may be configured to display an "+Add Package Line Item" icon. An "+Add Package Line Item" icon may be configured to add additional transport component group data to transport component group table 812. In some embodiments, GUI 800 may display first transitional icon 816. First transitional icon 816 may communicate data of transport component table 808 and/or transport component group table 812 to item window 508 of GUI 500. GUI 800 may include second transitional icon 820. Second transitional icon 820 may be configured to remove data entered into GUI 800 and/or close GUI 800 upon engagement. In some embodiments, GUI 800 may include window minimizer 804. A "window minimizer" as used in this disclosure is a graphical icon configured to show or hide a window. Windo minimizer 804 may include an icon, such as, but not limited to, a downward pointing arrow, upwards pointing arrow, and the like. In some embodiments, GUI 800 may include a plurality of window minimizers 804.

Figure 9:
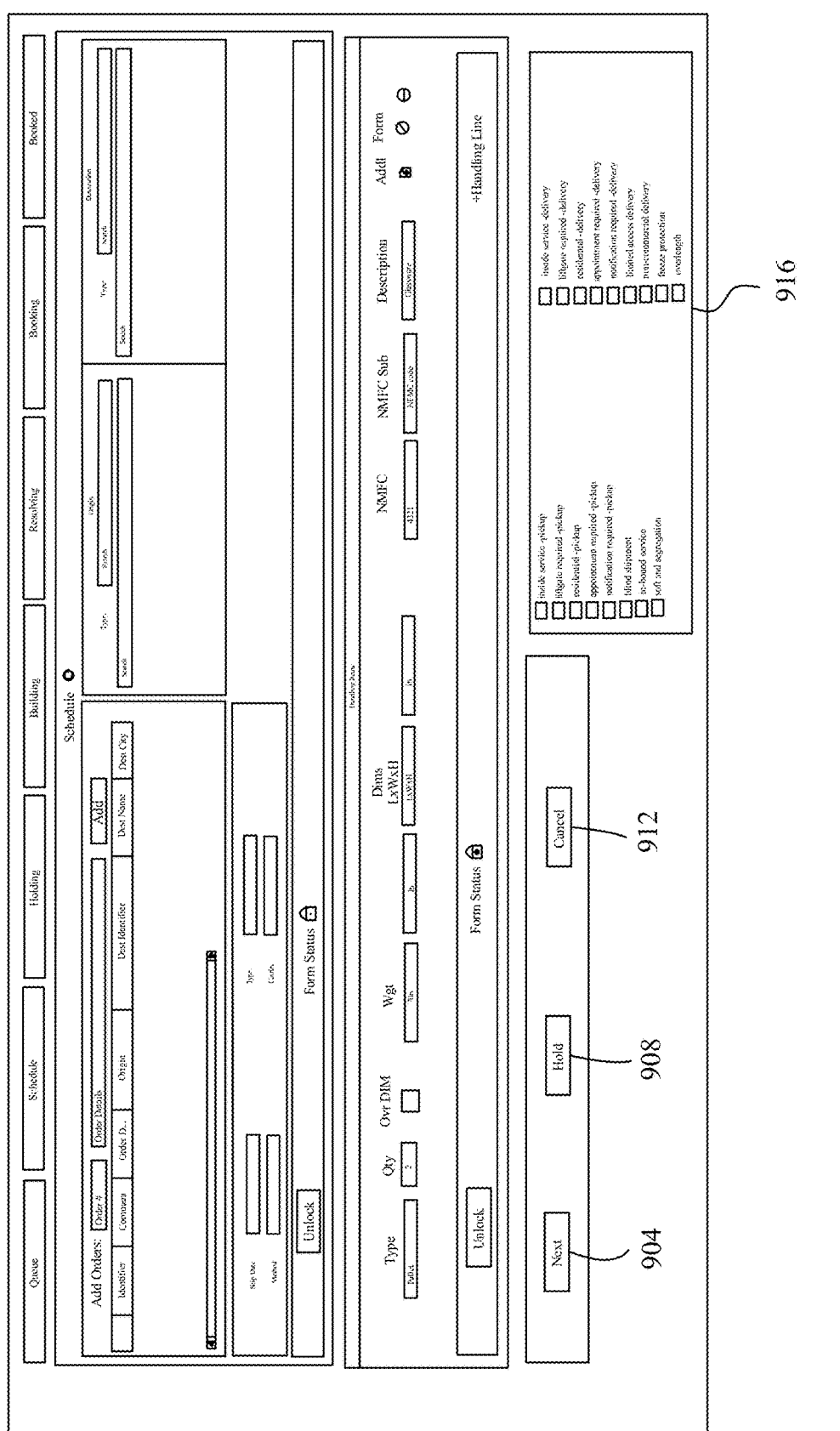
FIG. 9 illustrates another exemplary embodiment of a multi-part display window.

Referring now to FIG. 9, an exemplary embodiment of a GUI 900 is shown. GUI 900 may include one or more portions of GUI 500 as described above with reference to FIG. 5. In some embodiments, GUI 900 may include conditional indicators 916. A "conditional indicator" as used in this disclosure is a graphical icon corresponding to a parameter of a transport. A parameter of a transport may include, but is not limited to, inside service, liftgate requirements, residential locations, appointment requirements, notification requirements, blind transports, in-bound transports, soft and segregation transports, pickup status, delivery status, limited access requirements, non-commercial status, freeze protection, overlength, and the like. In some embodiments, conditional indicators 916 may be configured to receive user input, such as, but not limited to, clicking on a box of a transport parameter. Transport parameters may be entered by user input, external computing devices, and the like. In some embodiments, GUI 900 may include first transitional button 904. First transitional button 904 may include a text icon showing the word "Next". Engagement with first transitional button 904 may generate another window, re-direct a user to another part of a GUI, and the like. In some embodiments, GUI 900 may include second transitional button 908. Second transitional button 908 may include a text icon showing the word "Hold". Second transitional button 908 may save transport data of GUI 900 upon engagement. In some embodiments, second transitional button 908 may update a status tab of GUI 900. GUI 900 may include third transitional button 912. Third transitional button 912 may include a text icon showing the word "Cancel". Third transitional button 912 may be configured to remove transport data, windows, and the like of GUI 900 upon engagement.

Figure 10:
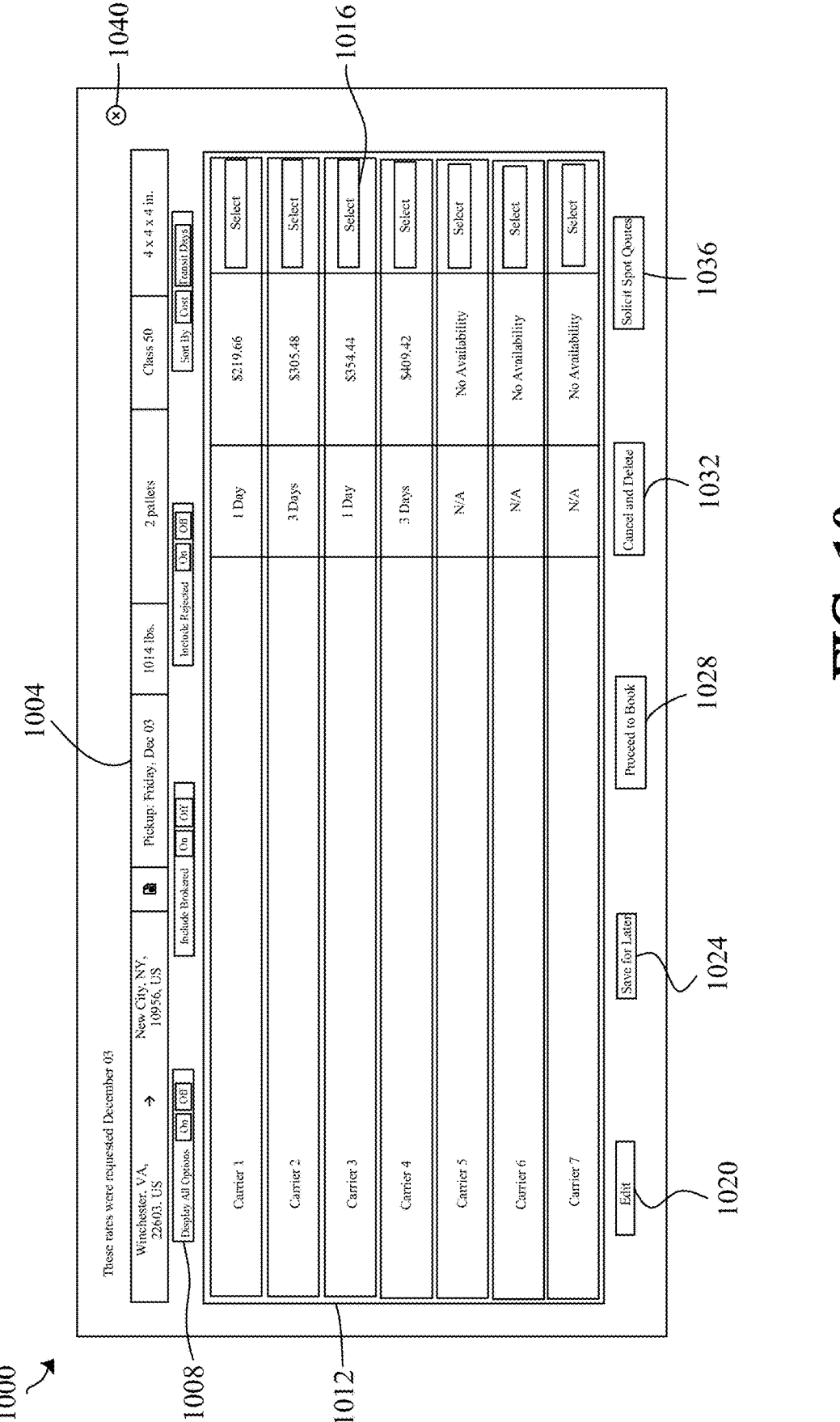
FIG. 10 illustrates an exemplary embodiment of a transport recommendation window.

Referring now to FIG. 10, an exemplary embodiment of transport recommendation GUI 1000 is shown. GUI 1000 may include filtering icons 1008. Filtering icons 1008 may be configured to update carrier recommendation table 1012. Filtering icons 1008 may include, but are not limited to, display all options, include brokered, include rejected, sort by cost, sort by transit days, and the like. Carrier recommendation table 1012 may be configured to display one or more carrier recommendations, such as, but not limited to, carrier names, transport times, transport costs, and the like. In some embodiments, Carrier recommendation table 1012 may include selection buttons 1016. Selection buttons 1016 may be configured to select one or more carrier recommendations of carrier recommendation table 1012. In some embodiments, selecting selection button 1016 may change a color of selection button 1016, for instance and without limitation, from gray to blue. In some embodiments, GUI 1000 may include transport overview indicator 1004. Transport overview indicator 1004 may include transport data such as, but not limited to, origin addresses, destinations, dates, weights, quantities, categories, dimensions, and the like. In some embodiments, GUI 1000 may include cancel button 1040. Cancel button 1040 may include a circular icon with an "x" positioned inside the circular icon. Cancel button 1040 may be configured to close or otherwise remove GUI 1000 from a user. In some embodiments, GUI 1000 may include edit icon 1020. Edit icon 1020 may be configured to allow a user to edit data of a transport. In some embodiments, GUI 1000 may include save icon 1024. Save icon 1024 may be configured to save transport data of a transport. GUI 1000 may include progression button 1028. Progression button 1028 may be configured to initiate a transport with a transport entity, such as, but not limited to, a carrier of carrier recommendation table 1012. GUI 1000 may include cancel icon 1032. Cancel icon 1032 may be configured to remove some or all of transport data entered by a user. GUI 1000 may include additional transport cost icon 1036. Additional transport icon 1036 may be configured to display additional transport costs of carriers, such as through a pop-up window, carrier recommendation table 1012, and the like. In some embodiments, additional transport icon 1036 may be configured to generate a "spot quote" of a carrier.

Figure 11:
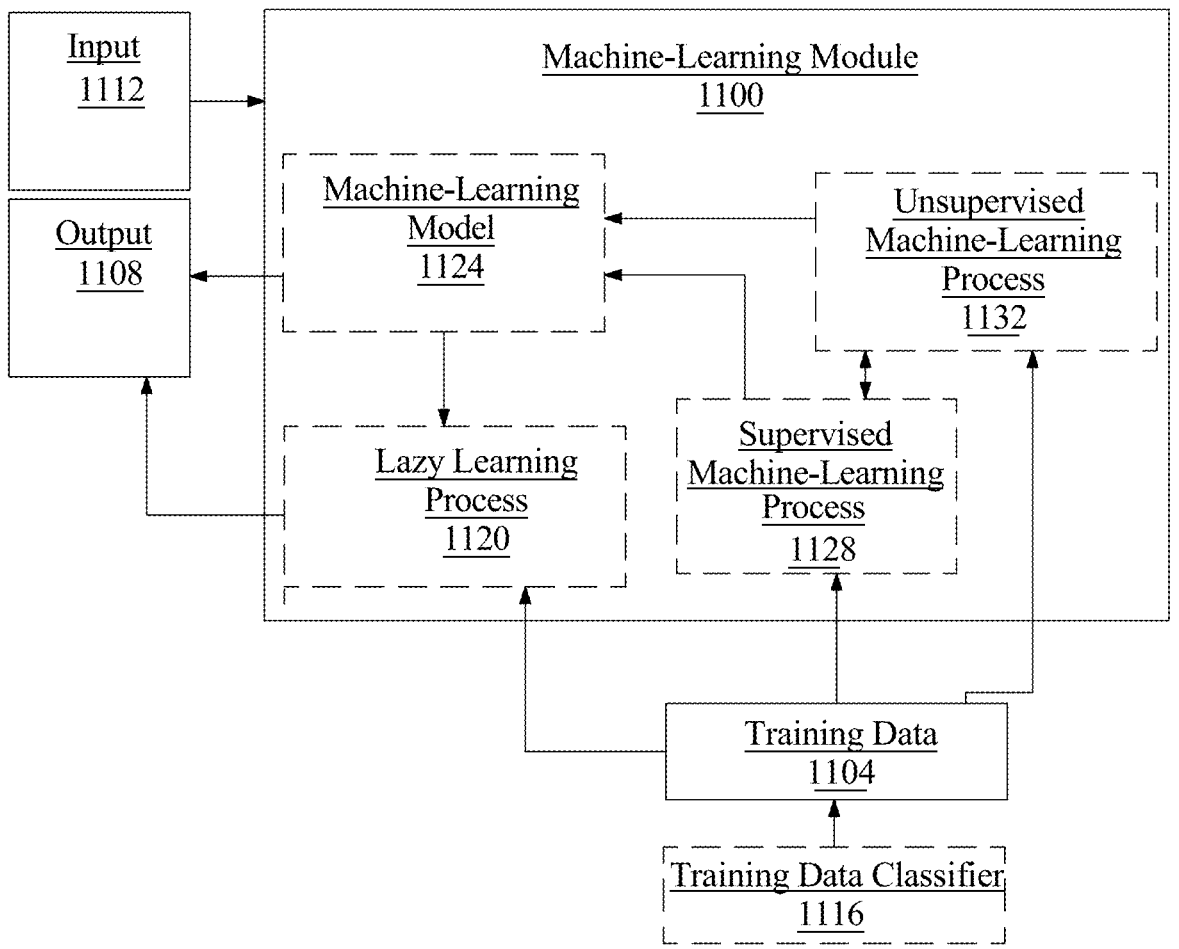
FIG. 11 is an exemplary embodiment of a block diagram of a machine learning model.

Referring now to FIG. 11, an exemplary embodiment of a machine-learning module 1100 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1104 to generate an algorithm that will be performed by a computing device/module to produce outputs 1108 given data provided as inputs 1112; this is in contrast to a non-machine learning software program where the commands to be executed are determined in advance by a user and written in a programming language.

Still referring to FIG. 11, "training data," as used herein, is data containing correlations that a machine-learning process may use to model relationships between two or more categories of data elements. For instance, and without limitation, training data 1104 may include a plurality of data entries, each entry representing a set of data elements that were recorded, received, and/or generated together; data elements may be correlated by shared existence in a given data entry, by proximity in a given data entry, or the like. Multiple data entries in training data 1104 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1104 according to various correlations; correlations may indicate causative and/or predictive links between categories of data elements, which may be modeled as relationships such as mathematical relationships by machine-learning processes as described in further detail below. Training data 1104 may be formatted and/or organized by categories of data elements, for instance by associating data elements with one or more descriptors corresponding to categories of data elements. As a non-limiting example, training data 1104 may include data entered in standardized forms by persons or processes, such that entry of a given data element in a given field in a form may be mapped to one or more descriptors of categories. Elements in training data 1104 may be linked to descriptors of categories by tags, tokens, or other data elements; for instance, and without limitation, training data 1104 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively, or additionally, and continuing to refer to FIG. 11, training data 1104 may include one or more elements that are not categorized; that is, training data 1104 may not be formatted or contain descriptors for some elements of data. Machine-learning algorithms and/or other processes may sort training data 1104 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1104 to be made applicable for two or more distinct machine-learning algorithms as described in further detail below. Training data 1104 used by machine-learning module 1100 may correlate any input data as described in this disclosure to any output data as described in this disclosure. As a non-limiting illustrative example inputs may include transport data and/or user input, and outputs may include transport recommendations.

Further referring to FIG. 11, training data may be filtered, sorted, and/or selected using one or more supervised and/or unsupervised machine-learning processes and/or models as described in further detail below; such models may include without limitation a training data classifier 1116. Training data classifier 1116 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1100 may generate a classifier using a classification algorithm, defined as a process whereby a computing device and/or any module and/or component operating thereon derives a classifier from training data 1104. Classification may be performed using, without limitation, linear classifiers such as without limitation logistic regression and/or naive Bayes classifiers, nearest neighbor classifiers such as k-nearest neighbors' classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1116 may classify elements of training data to transport components, destinations, originations, transport times, and the like.

Still referring to FIG. 11, machine-learning module 1100 may be configured to perform a lazy-learning process 1120 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1104. Heuristic may include selecting some number of highest-ranking associations and/or training data 1104 elements. Lazy learning may implement any suitable lazy learning algorithm, including without limitation a K-nearest neighbors' algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively, or additionally, and with continued reference to FIG. 11, machine-learning processes as described in this disclosure may be used to generate machine-learning models 1124. A "machine-learning model," as used in this disclosure, is a mathematical and/or algorithmic representation of a relationship between inputs and outputs, as generated using any machine-learning process including without limitation any process as described above and stored in memory; an input is submitted to a machine-learning model 1124 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1124 may be generated by creating an artificial neural network, such as a convolutional neural network comprising an input layer of nodes, one or more intermediate layers, and an output layer of nodes. Connections between nodes may be created via the process of "training" the network, in which elements from a training data 1104 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 11, machine-learning algorithms may include at least a supervised machine-learning process 1128. At least a supervised machine-learning process 1128, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include transport data as described above as inputs, transport carrier recommendations as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1104. Persons skilled in the art, upon reviewing the entirety of this disclosure, will be aware of various possible variations of at least a supervised machine-learning process 1128 that may be used to determine relation between inputs and outputs. Supervised machine-learning processes may include classification algorithms as defined above.

Further referring to FIG. 11, machine learning processes may include at least an unsupervised machine-learning processes 1132. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 11, machine-learning module 1100 may be designed and configured to create a machine-learning model 1124 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 11, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors' algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 12:
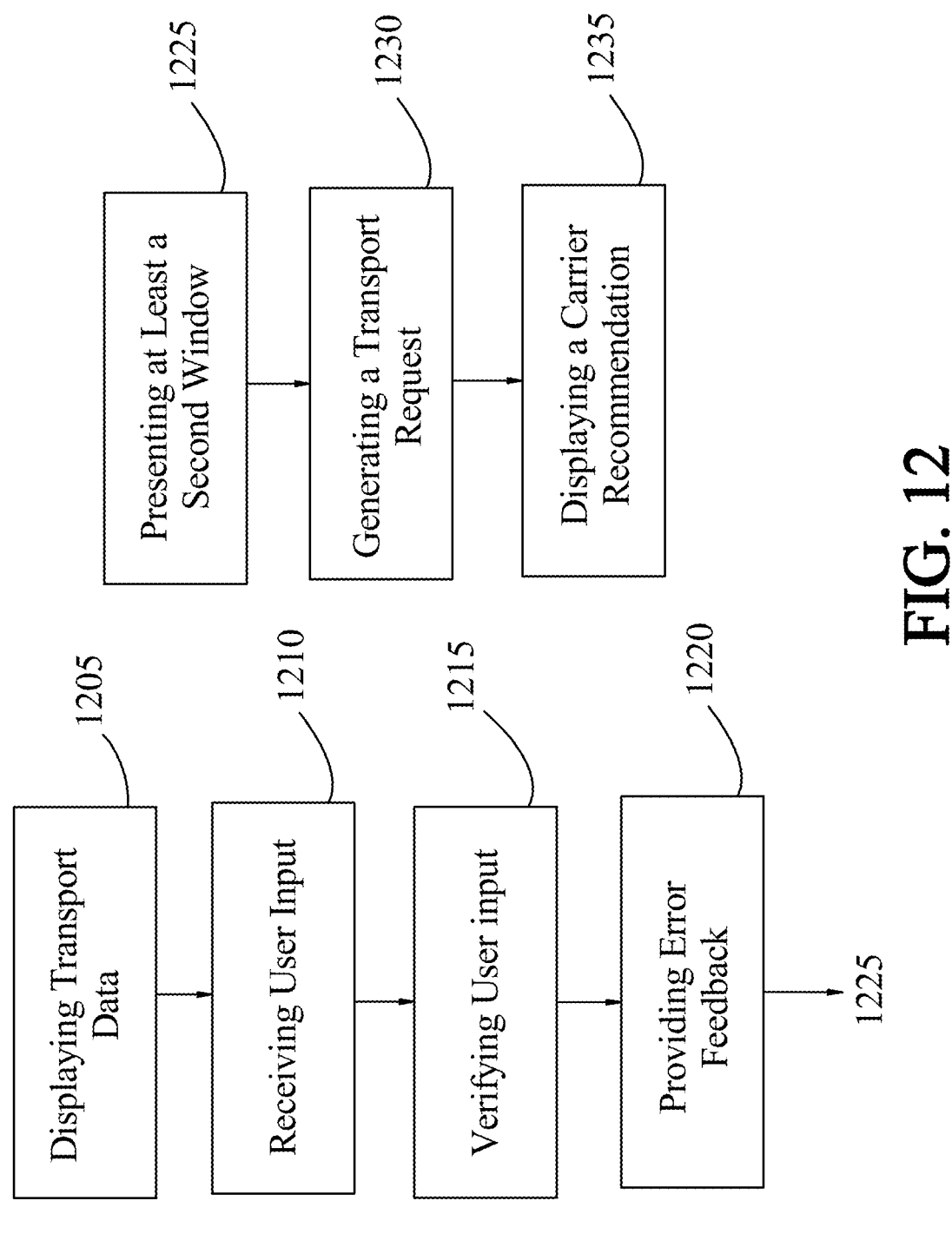
FIG. 12 is a method of generating a transport request.

Referring now to FIG. 12, a method of generating a transport request 1200 is presented. At step 1205, method 1200 includes displaying transport data. Transport data may be displayed through a GUI. In some embodiments, transport data may be displayed through a multi-part display window of a GUI. This step may be implemented without limitation as described above in FIGS. 1-11.

Still referring to FIG. 12, at step 1210, method 1200 includes receiving user input. User input may be received through a GUI. In some embodiments, user input may include, but is not limited to, text entries, clicks, and the like. This step may be implemented without limitation as described above in FIGS. 1-11.

Still referring to FIG. 12, at step 1215, method 1200 includes verifying user input. User input may be verified through a verification module of an apparatus and/or GUI. Verification may include comparing user input to transport databases, such as, but not limited to, USPS databases. In some embodiments, verification may include validating correct spelling, quantities, dates, destinations, and the like. This step may be implemented without limitation as described above in FIGS. 1-11.

Still referring to FIG. 12, at step 1220, method 1200 includes providing error feedback. Error feedback may be provided through a GUI. In some embodiments, error feedback may include a pop-up window displaying a quantity of errors. Error feedback may list specific invalid data entries received from a user. This step may be implemented without limitation as described above in FIGS. 1-11.

Still referring to FIG. 12, at step 1225, method 1200 includes presenting at least a second window. At least a second window may include a window of a multi-part display window of a GUI. In some embodiments, at least a second window may display additional transport data. This step may be implemented without limitation as described above in FIGS. 1-11.

Still referring to FIG. 12, at step 1230, method 1200 includes generating a transport request. A transport request may be generated as a function of user input. In some embodiments, a transport request may include transport data such as, but not limited to, destinations, transport carriers, transport vehicles, transport paths, transport components, and the like. This step may be implemented without limitation as described above in FIGS. 1-11.

Still referring to FIG. 12, at step 1225, method 1200 includes displaying a carrier recommendation. A carrier recommendation may be displayed through a GUI. A carrier recommendation may include a list of carriers generated as a function of a transport request. A list of carriers may be ranked by, but not limited to, cost, transport times, transport paths, and the like. This step may be implemented without limitation as described above in FIGS. 1-11.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 13:
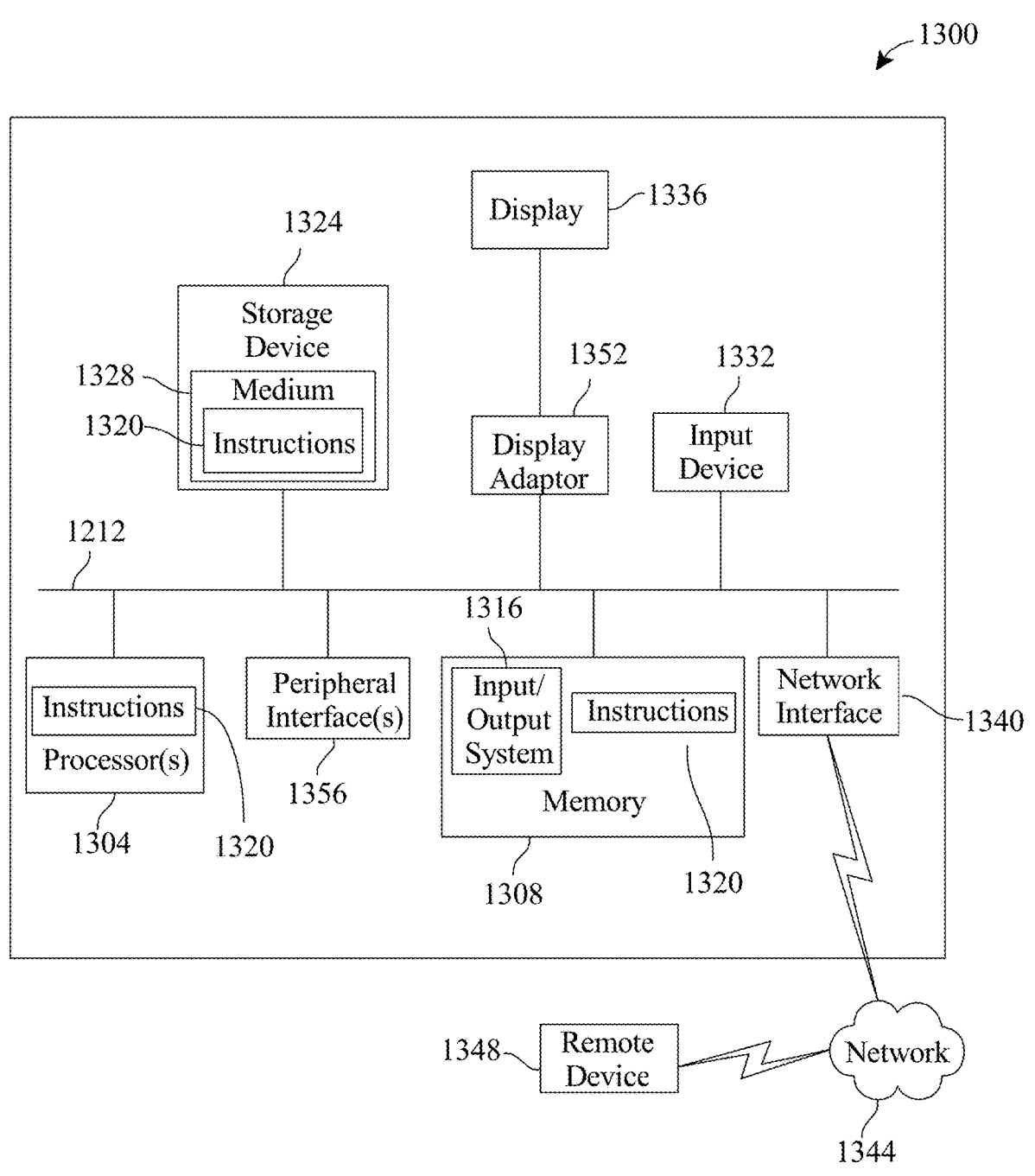
FIG. 13 is a block diagram of a computing system that can be used to implement any one or more of the methodologies disclosed herein and any one or more portions thereof.

FIG. 13 shows a diagrammatic representation of one embodiment of a computing device in the exemplary form of a computer system 1300 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1300 includes a processor 1304 and a memory 1308 that communicate with each other, and with other components, via a bus 1312. Bus 1312 may include any of several types of bus structures including, but not limited to, a memory bus, a memory controller, a peripheral bus, a local bus, and any combinations thereof, using any of a variety of bus architectures.

Still referring to FIG. 13, processor 1304 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1304 may be organized according to Von Neumann and/or Harvard architecture as a non-limiting example. Processor 1304 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Still referring to FIG. 13, memory 1308 may include various components (e.g., machine-readable media) including, but not limited to, a random-access memory component, a read only component, and any combinations thereof. In one example, a basic input/output system 1316 (BIOS), including basic routines that help to transfer information between elements within computer system 1300, such as during start-up, may be stored in memory 1308. Memory 1308 may also include (e.g., stored on one or more machine-readable media) instructions (e.g., software) 1320 embodying any one or more of the aspects and/or methodologies of the present disclosure. In another example, memory 1308 may further include any number of program modules including, but not limited to, an operating system, one or more application programs, other program modules, program data, and any combinations thereof.

Still referring to FIG. 13, computer system 1300 may also include a storage device 1324. Examples of a storage device (e.g., storage device 1324) include, but are not limited to, a hard disk drive, a magnetic disk drive, an optical disc drive in combination with an optical medium, a solid-state memory device, and any combinations thereof. Storage device 1324 may be connected to bus 1312 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1324 (or one or more components thereof) may be removably interfaced with computer system 1300 (e.g., via an external port connector (not shown)). Particularly, storage device 1324 and an associated machine-readable medium 1328 may provide nonvolatile and/or volatile storage of machine-readable instructions, data structures, program modules, and/or other data for computer system 1300. In one example, software 1320 may reside, completely or partially, within machine-readable medium 1328. In another example, software 1320 may reside, completely or partially, within processor 1304.

Still referring to FIG. 13, computer system 1300 may also include an input device 1332. In one example, a user of computer system 1300 may enter commands and/or other information into computer system 1300 via input device 1332. Examples of an input device 1332 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1332 may be interfaced to bus 1312 via any of a variety of interfaces (not shown) including, but not limited to, a serial interface, a parallel interface, a game port, a USB interface, a FIREWIRE interface, a direct interface to bus 1312, and any combinations thereof. Input device 1332 may include a touch screen interface that may be a part of or separate from display 1336, discussed further below. Input device 1332 may be utilized as a user selection device for selecting one or more graphical representations in a graphical interface as described above.

Still referring to FIG. 13, a user may also input commands and/or other information to computer system 1300 via storage device 1324 (e.g., a removable disk drive, a flash drive, etc.) and/or network interface device 1340. A network interface device, such as network interface device 1340, may be utilized for connecting computer system 1300 to one or more of a variety of networks, such as network 1344, and one or more remote devices 1348 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1344, may employ a wired and/or a wireless mode of communication. In general, any network topology may be used. Information (e.g., data, software 1320, etc.) may be communicated to and/or from computer system 1300 via network interface device 1340.

Still referring to FIG. 13, computer system 1300 may further include a video display adapter 1352 for communicating a displayable image to a display device, such as display device 1336. Examples of a display device include, but are not limited to, a liquid crystal display (LCD), a cathode ray tube (CRT), a plasma display, a light emitting diode (LED) display, and any combinations thereof. Display adapter 1352 and display device 1336 may be utilized in combination with processor 1304 to provide graphical representations of aspects of the present disclosure. In addition to a display device, computer system 1300 may include one or more other peripheral output devices including, but not limited to, an audio speaker, a printer, and any combinations thereof. Such peripheral output devices may be connected to bus 1312 via a peripheral interface 1356. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. An apparatus for generating a transport request, comprising:

at least a processor and a memory communicatively connected to the at least a processor, the memory containing instructions configuring the at least a processor to:

generate a graphical user interface (GUI), wherein the graphical user interface comprises:

an event handler, wherein the event handler receives a user input;

a multi-part display window, wherein each part of the multi-part display window displays transport data and wherein the multi-part display window is generated as a pop-up window by the event handler after receiving the user input and displayed to a user on an electronic device;

at least a user input field of the multi-part display window, wherein the user input field is configured to receive user input and update at least a part of the multi-part display window as a function of the user input, wherein the multi-part display window displays a predicted user input as a function of previous received user inputs wherein the predicted user input is further generated using a predictive input generator wherein the predictive input generator generates a predicted user input as a function of a predicted user input machine learning model trained with training data correlating the user input to the predictive user input, wherein the predictive input generator comprises a program that builds a library of textual elements over a period of time, and wherein each textual element of the library of textual elements is assigned a score by determining a probability of the user typing a phrase associated with the textual element;

a transitional button, wherein the transitional button is configured to present at least a second multi-part display window to a user as a function of a user selection;

a verification module, wherein the verification module is configured to analyze the transport data and display warning icons to a user as a function of the analyzation, wherein analyzing the transport data comprises:

searching through at least one database using a web-crawler function;

updating the verification module based on the searching through the at least one database; and comparing the transport data with the updated verification module; and an error prevention module, wherein the error prevention module is configured to prevent a user from accessing the transitional button as a function of an access criterion;

convert the transport data into a transport data fuzzy set;

generate a transport request for the user as a function of the user input of the GUI wherein generating the transport request comprises generating a transport request optimization model, wherein the transport request optimization model is configured to:

identify at least one desired cost attribute for a transport as a function of a weighted aggregation of transport constraints, wherein the transport request optimization model is configured to minimize a cost function as a function of the weighted aggregation of transport constraints;

generate a transport recommendation for the transport request for the user, wherein generating the transport recommendation comprises:

classifying the transport data fuzzy set with the transport recommendation using a fuzzy set comparison, wherein the transport data fuzzy set is compared to a plurality of transport recommendation fuzzy sets, wherein classifying the transport data further comprises:

determining a degree of overlap between the transport data fuzzy set and each transport recommendation fuzzy set of the plurality of transport recommendation fuzzy sets; and classifying the transport data to the transport recommendation as a function of the degree of overlap; and provide the transport recommendation through the GUI, wherein the apparatus is configured to perform any one of a plurality of steps in parallel.

2. The apparatus of claim 1, wherein the at least a processor is further configured to generate a unique transport identifier.

3. The apparatus of claim 1, wherein providing the transport recommendation includes:

comparing at least two carriers using an objective function; and providing the transport recommendation as a function of the comparison.

4. The apparatus of claim 1, wherein the at least a processor is further configured to generate a transport status of a transport and display the transport status through the graphical user interface.

5. The apparatus of claim 1, wherein the at least a processor is further configured to validate destination data of the transport request.

6. The apparatus of claim 1, wherein the transport request includes at least two transport component classifications.

7. The apparatus of claim 1, wherein the graphical user interface includes an item window configured to display additional transport data to the user.

8. The apparatus of claim 1, wherein the graphical user interface includes a filter icon configured to filter transport data as a function of a second user input.

9. A method of generating a transport request using a computing device, comprising:

displaying transport data through a multi-part display window of a graphical user interface (GUI), wherein the multi-part display window is generated as a pop-up window by an event handler after receiving a user input and displayed to a user on an electronic device;

receiving user input from at least a user input field of the multi-part display window of the GUI, wherein the multi-part display window displays a predicted user input as a function of previous received user inputs wherein the predicted user input is further generated using a predictive input generator wherein the predictive input generator generates a predicted user input as a function of a predicted user input machine learning model trained with training data correlating the user input to the predictive user input, wherein the predictive input generator comprises a program that builds a library of textual elements over a period of time, and wherein each textual element of the library of textual elements is assigned a score by determining a probability of the user typing a phrase associated with the textual element;

verifying the user input as a function of a verification module of the GUI, wherein the verification module is configured to analyze the transport data and analyzing the transport data comprises:

searching through at least one database using a web-crawler function;

updating the verification module based on the searching through the at least one database; and comparing the transport with the updated verification module;

providing error feedback through the GUI as a function of an error prevention module of the GUI;

presenting at least a second window of the multi-part display window on the GUI as a function of a transitional button of the GUI;

converting the transport data into a transport data fuzzy set;

generating a transport request for the user as a function of the user input of the GUI wherein generating the transport request comprises generating a transport request optimization model, wherein the transport request optimization model is configured to:

identify at least one desired cost attribute for a transport as a function of a weighted aggregation of transport constraints, wherein the transport request optimization model is configured to minimize a cost function;

generating a transport recommendation for the transport request for the user, wherein generating the transport recommendation comprises:

classifying the transport data fuzzy set with the transport recommendation using a fuzzy set comparison, wherein the transport data fuzzy set is compared to a plurality of transport recommendation fuzzy sets, wherein classifying the transport data further comprises:

determining a degree of overlap between the transport data fuzzy set and each transport recommendation fuzzy set of the plurality of transport recommendation fuzzy sets; and classifying the transport data to the transport recommendation as a function of the degree of overlap; and displaying the transport recommendation through the GUI, wherein the method further comprises processing any of a plurality of preceding method steps in parallel.

10. The method of claim 9, further comprising generating a unique transport identifier.

11. The method of claim 9, wherein providing the transport recommendation includes:

comparing at least two carriers using an objective function; and providing the transport recommendation as a function of the comparison.

12. The method of claim 9, further comprising generating a transport status of a transport and displaying the transport status through the graphical user interface.

13. The method of claim 9, further comprising validating destination data of the transport request.

14. The method of claim 9, wherein the transport request includes at least two transport component classifications.

15. The method of claim 9, wherein the graphical user interface includes an item window configured to display additional transport data to the user.

16. The method of claim 9, wherein the graphical user interface includes a filter icon configured to filter transport data as a function of a second user input.

* * * * *